United States Patent [19]
Paynter

[11] Patent Number: 4,784,042
[45] Date of Patent: Nov. 15, 1988

[54] METHOD AND SYSTEM EMPLOYING STRINGS OF OPPOSED GASEOUS-FLUID INFLATABLE TENSION ACTUATORS IN JOINTED ARMS, LEGS, BEAMS AND COLUMNS FOR CONTROLLING THEIR MOVEMENTS

[75] Inventor: Henry M. Paynter, Adams Rd., R.R. #1, Box 306A, Pittsford, Vt. 05763

[73] Assignees: Nathaniel A. Hardin, Forsyth, Ga.; Henry M. Paynter, Pittsford, Vt.; a part interest

[21] Appl. No.: 13,247

[22] Filed: Feb. 10, 1987

Related U.S. Application Data

[63] Continuation-in-part of Ser. No. 828,786, Feb. 12, 1986, abandoned.

[51] Int. Cl.[4] .................. F15B 11/00; F15B 13/00; F01B 19/00
[52] U.S. Cl. .................. 91/534; 92/48; 92/92; 414/7; 901/21; 901/22
[58] Field of Search .................. 91/51, 443, 530, 534; 92/48, 90, 91, 92; 901/21, 22; 414/7

[56] References Cited

U.S. PATENT DOCUMENTS

| | | | |
|---|---|---|---|
| 2,844,126 | 7/1958 | Gaylord | 92/90 |
| 3,284,964 | 11/1966 | Saito | 414/7 X |
| 3,645,173 | 2/1972 | Yarlott | 92/92 |
| 4,494,417 | 1/1985 | Larson et al. | 74/479 X |
| 4,551,061 | 11/1985 | Olenick | 901/21 X |
| 4,615,260 | 10/1986 | Takagi et al. | 92/92 |
| 4,621,965 | 11/1986 | Wilcock | 901/21 X |
| 4,689,538 | 8/1987 | Sakaguchi et al. | 901/22 X |

FOREIGN PATENT DOCUMENTS

| | | | |
|---|---|---|---|
| 951885 | 4/1949 | France | 92/90 |
| 422580 | 3/1974 | U.S.S.R. | 901/22 |
| 837845 | 6/1981 | U.S.S.R. | 901/22 |

Primary Examiner—Robert E. Garrett
Assistant Examiner—Mark A. Williamson
Attorney, Agent, or Firm—Parmelee, Bollinger & Bramblett

[57] ABSTRACT

The method and system employ strings of tension actuators in opposed relationship for controlling motions or deflections of jointed members: for example, for controlling the motions of arms, legs and elephant trunks or flexible antennae in robots and for controlling the deflections of beams and columns in frames and structures. These opposed tension actuators are inflated with controlled air pressures which are oppositely varied from a predetermined common-mode pressure $P_o$ (initial fluid pressure level $P_o$). In other words, as one tension actuator is being inflated with pressure increasing above $P_o$, the opposed tension actuator is being inflated with pressure decreasing below $P_o$ for producing motion or deflection of the jointed member in one direction, and conversely for producing motion or deflection in the other direction. The opposed tension actuators have their ends anchored to rigid movable plates or struts containing sockets for the respective joints. By virtue of controlling the opposed actuators with a common-mode pressure level $P_o$, they are always exerting a net compressive force on each joint, so advantageously permitting usage of simple, inexpensive, lightweight, non-capturing joints as shown. Moreover, the jointed member automatically returns to a predetermined mid-range rest position whenever air pressures are returned to $P_o$. A nearly uniform stiffness (or mechanical output impedance) is provided at all positions by controlling the opposed pressures to be $P_o + \Delta P$ and $P_o - \Delta P$, where $\Delta P$ is a corresponding increment above and below the initial (common-mode) level $P_o$. In this way, precision open-loop proportional control is achieved.

40 Claims, 12 Drawing Sheets

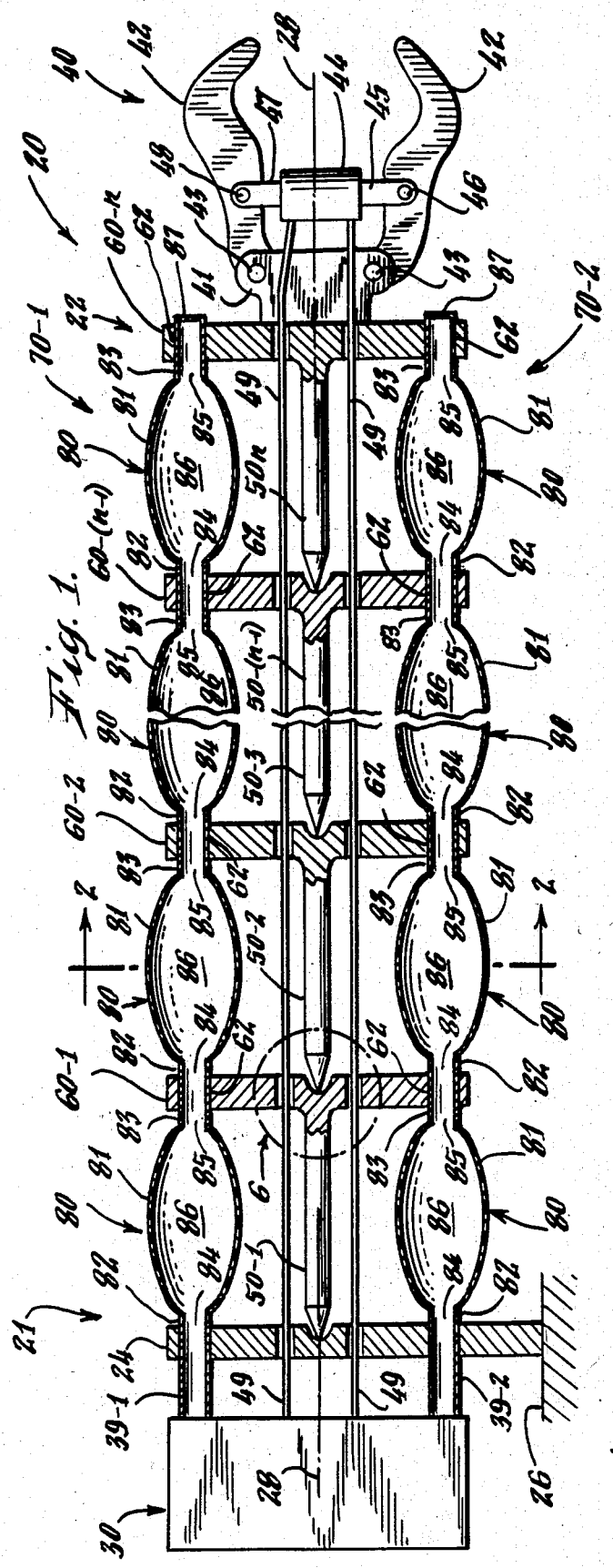
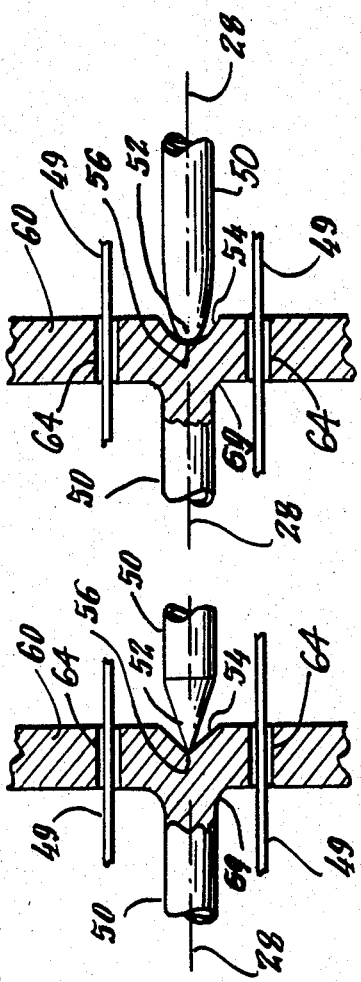
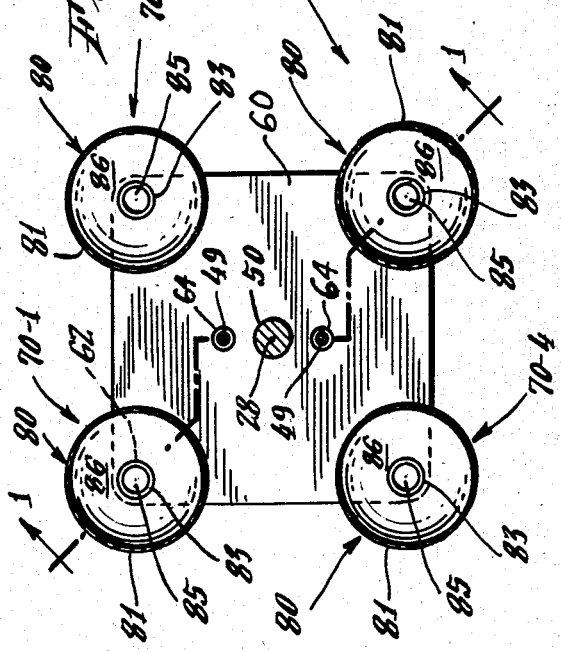

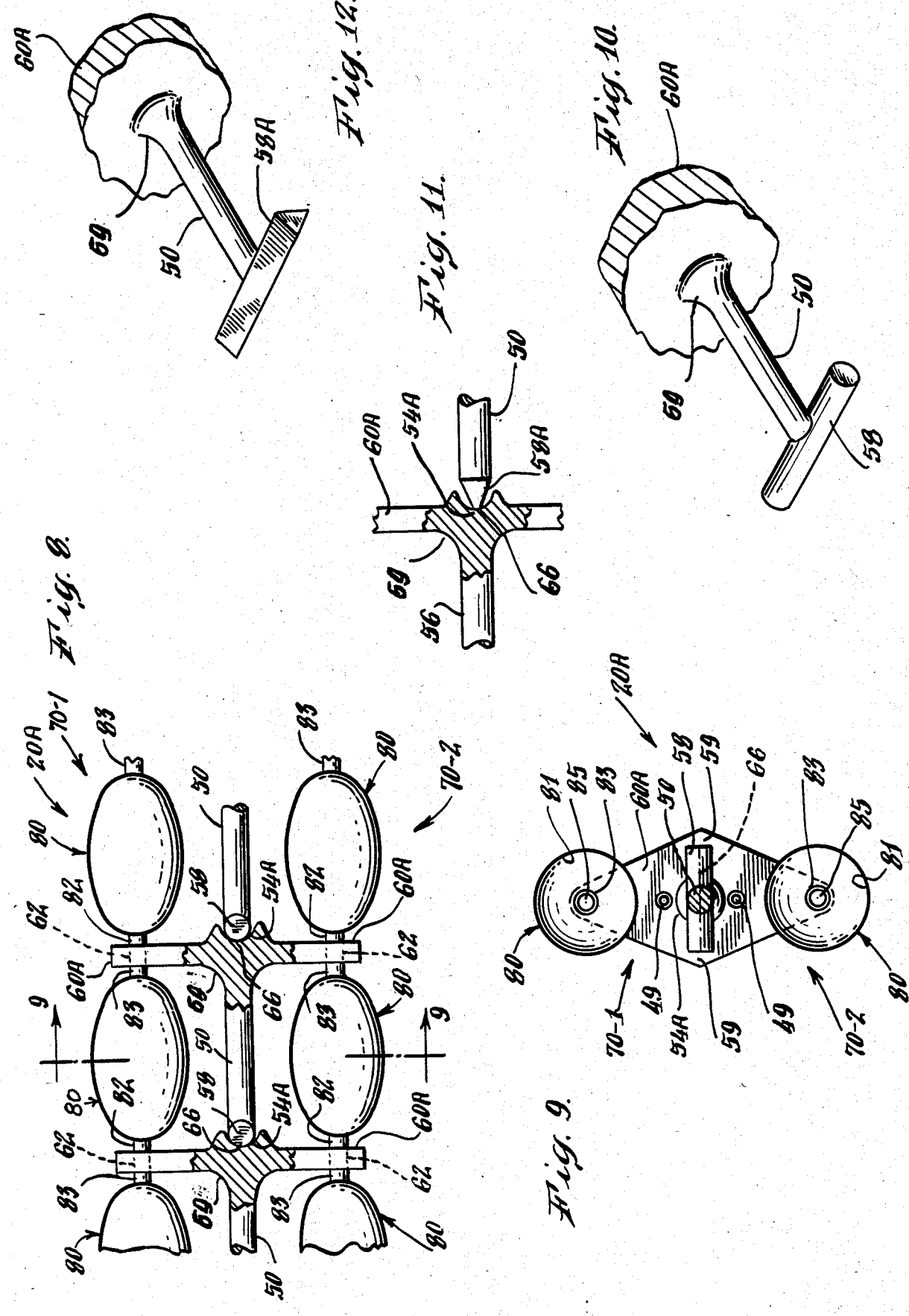

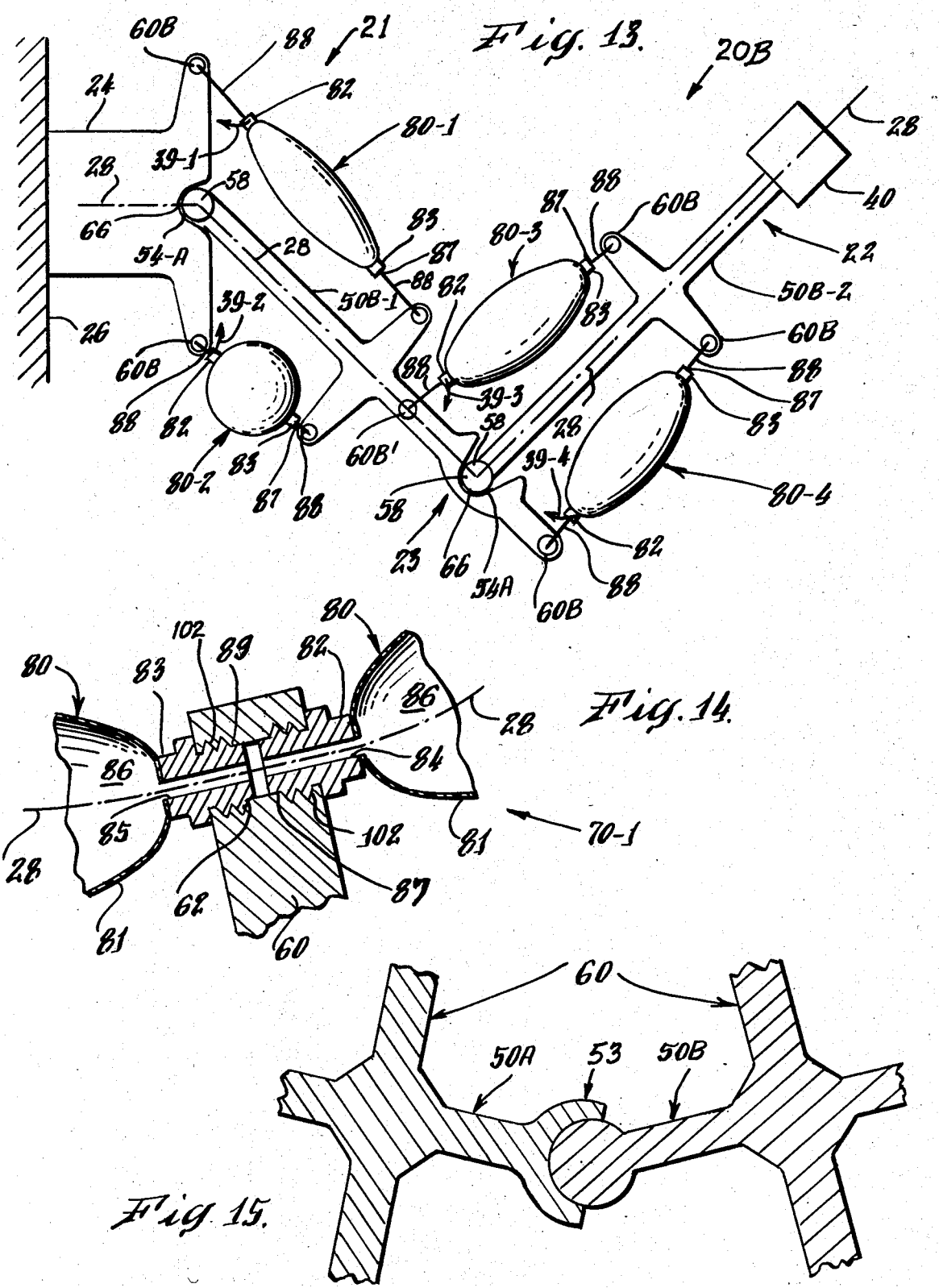

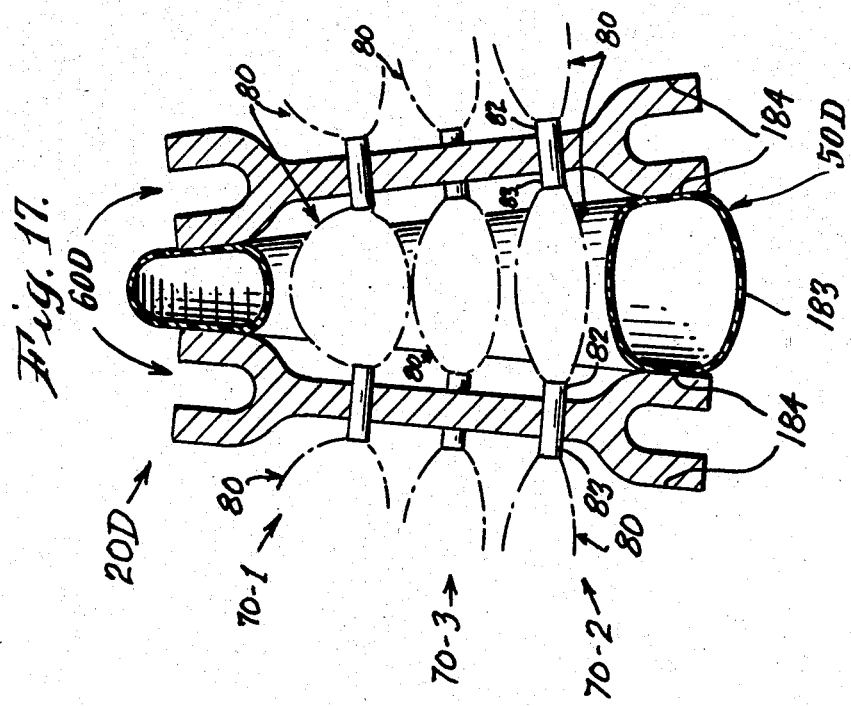
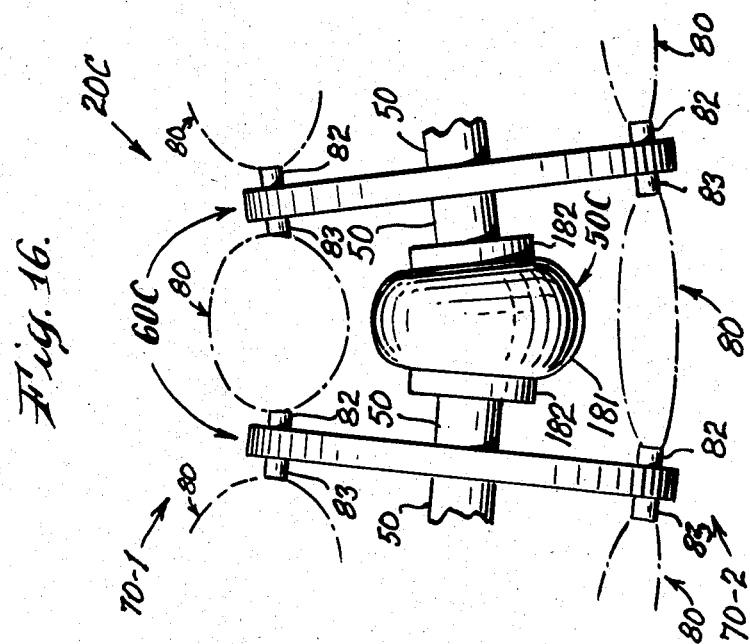

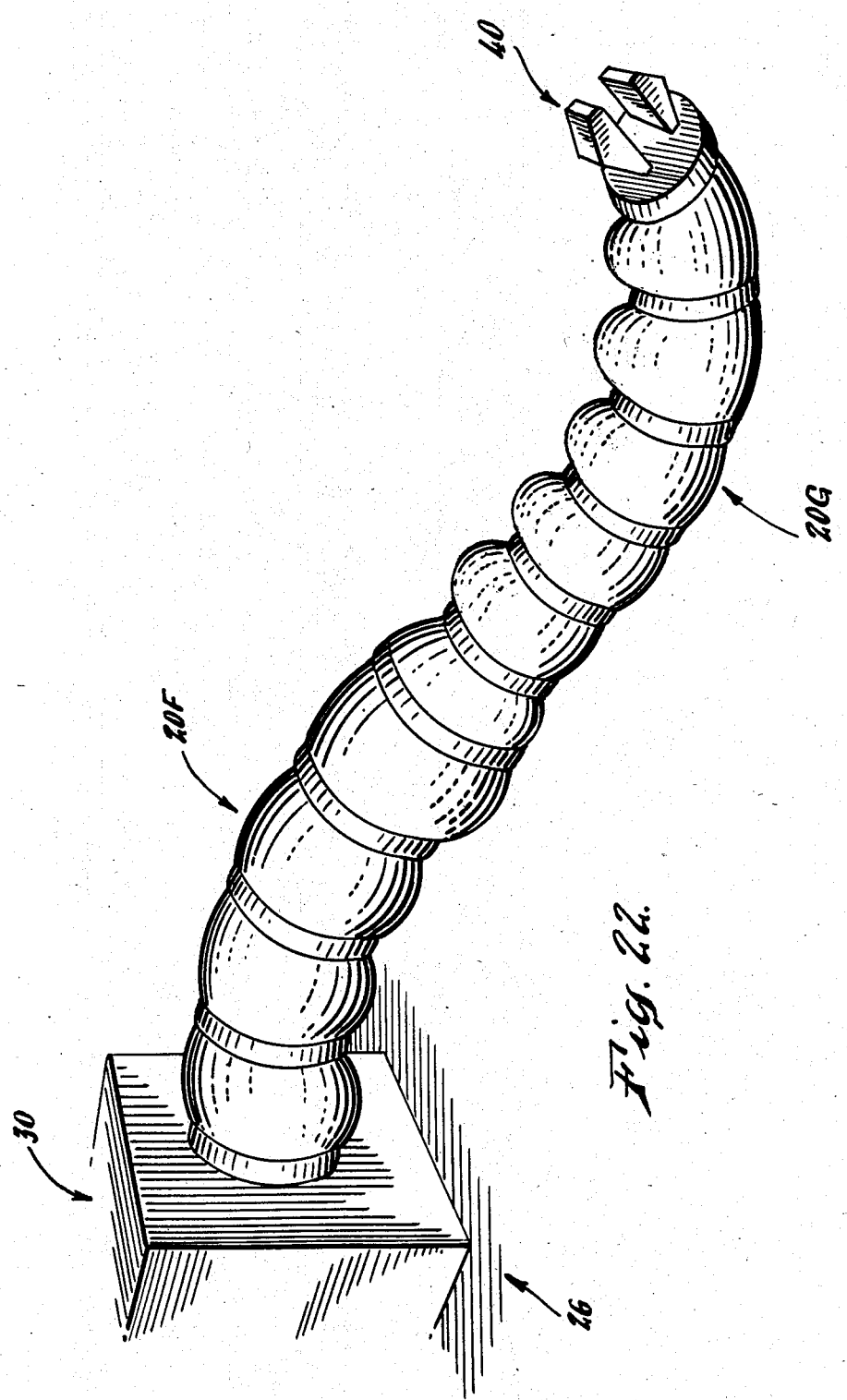

FIG. 25A
FIG. 25B
T = TENSION FORCE
FIG. 26A
FIG. 26B
C = COMPRESSION FORCE
FIG. 27A
FIG. 27B
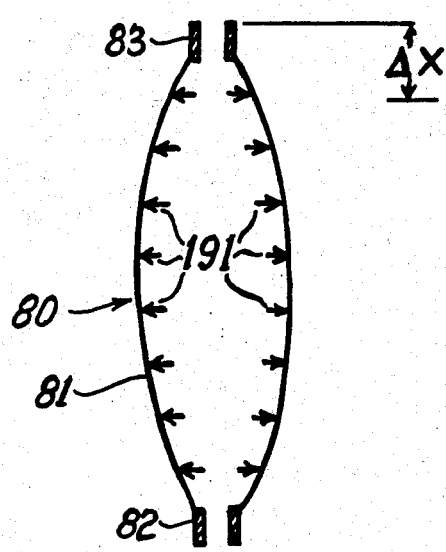
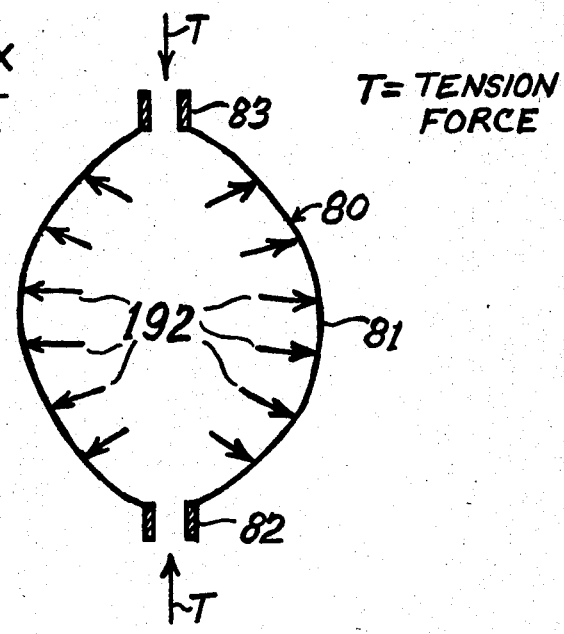
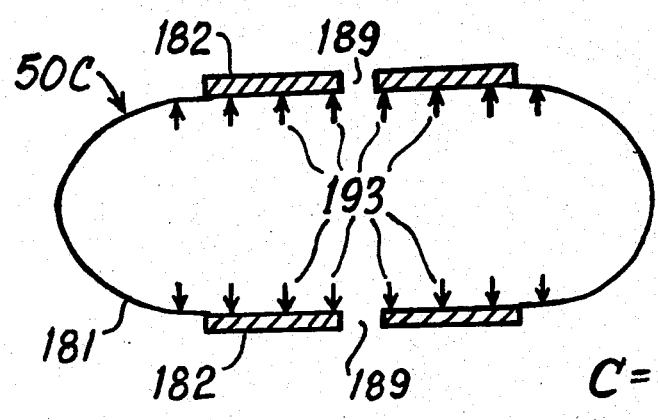
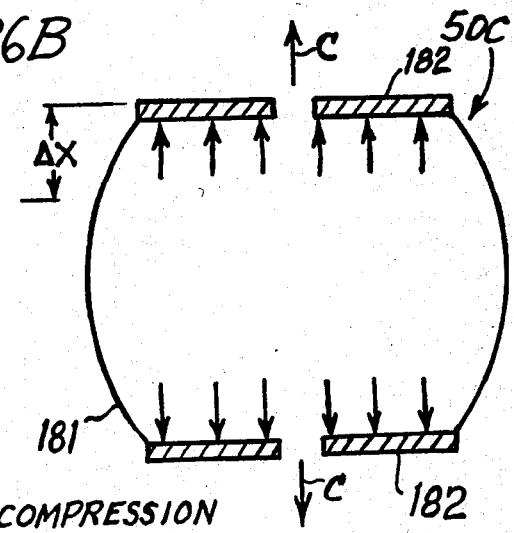
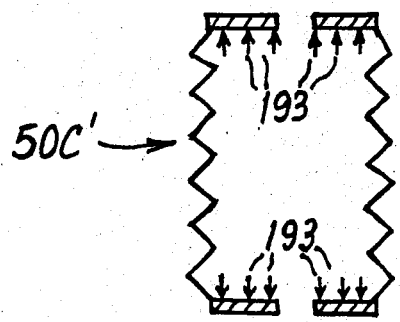
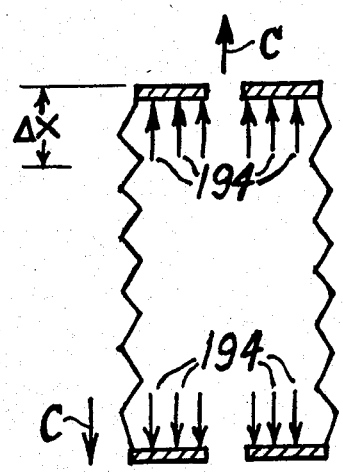

METHOD AND SYSTEM EMPLOYING STRINGS OF OPPOSED GASEOUS-FLUID INFLATABLE TENSION ACTUATORS IN JOINTED ARMS, LEGS, BEAMS AND COLUMNS FOR CONTROLLING THEIR MOVEMENTS

RELATED APPLICATION

The present application is a continuation in part of copending U.S. Ser. No. 828,786, filed on Feb. 12, 1986, and abandoned subsequent to the filing of the present application.

FIELD OF THE INVENTION

The present invention is in the field of air-inflatable tension actuators which decrease in length as they are inflated and conversely which elongate as they are deflated, for example as shown in U.S. Pat. No. 3,645,173 of John M. Yarlott, and as shown in my copending patent application Ser. No. 754,523 More particularly, this invention relates to a method and system employing elongated strings of such pneumatic tension actuators arranged and operated in opposed relationship in jointed arms, legs, beams and columns for controlling their movements, for example for controlling the movements of arms, legs, elephant trunks or flexible antennae in robots and for controlling the deflections of beams and columns in frames and structures.

BACKGROUND OF THE DISCLOSURE

Small-size robots performing precise but rapid light assembly tasks, have often utilized electric and/or hydraulic drive operators. The mass and weight of such conventional operators have tended to limit the dynamic response of prior robots and to dominate the total cost of such robots.

SUMMARY OF THE DISCLOSURE

The present invention provides a method and a system wherein pneumatic tension actuators are interconnected in series to form strings arranged for controlling elongated jointed arms and the like. Such strings of tension actuators extend along opposite sides of the elongated jointed arm and they act in opposition to each other for controlling its motions or deflections.

The term "elongated jointed arm" is intended to be interpreted broadly to include various types of elongated jointed members, for example such as arms, legs, elephant trunks, flexible antennae, and the like, in robots and including beams and columns in chasses and carriages, all having a plurality of joints, with the joints being located at spaced positions along the length of the jointed member.

The opposed tension actuators are inflated with controlled air pressures which are oppositely varied from a predetermined common-mode pressure $P_o$ (initial fluid pressure level $P_o$). In other words, as one string of tension actuators is being inflated with pressure increasing above $P_o$, the opposed string is supplied with pressure decreasing below $P_o$, for producing motion or deflection of the jointed arm in one direction, and conversely for producing motion or deflection in the other direction. The jointed arm includes elongated links arranged in sequence in end-to-end relationship along the length or longitudinal axis of the arm. The first link in sequence is positioned near a supporting structure or support body, for example such as the body of a robot, and has a pivotal mounting to this support body, and the last link in the sequence is positioned and rigidly attached near the remote (or outer) end of the arm. Each successive link in the sequence has a single pivotal mounting to the preceding link for enabling the arm to bend and swing into various angular positions. Thus, the arm can curve or straighten can swing up or down.

Fastened rigidly to the above-described rigid links, there are rigid elements for controlling the movements of the arm, with a respective one of these rigid elements being located at each pivotal mounting and projecting out on opposite sides of the longitudinal axis of the arm. The strings of pneumatic tension actuators which have been described as extending along opposite sides of the jointed arm are offset from, i.e. spaced away from, the longitudinal axis of the arm. These strings are fastened to the respective rigid elements at fastening positions which are located at points located between tension actuators in the respective strings.

A controllable source of pressurized air communicates with the first tension actuator in each of the respective strings for controllably inflating the strings on opposite sides of the arm for producing arm motion, like muscles in the arm. By virtue of controlling the opposed strings of actuators with a common-mode pressure level $P_o$, they are always exerting a net compressive force on each pivotal mounting, i.e. each joint, so advantageously permitting usage of simple, inexpensive, lightweight, non-capturing joints as shown. Moreover, the use of a common-mode pressure automatically causes the jointed arm to return to a predetermined mid-range rest position whenever air pressures are returned to $P_o$. A nearly uniform stiffness (or mechanical output impedance) is provided at all arm positions by controlling the opposed pressures to be $P_o + \Delta P$ and $P_o - \Delta P$, where $\Delta P$ is a corresponding increment above and below the initial (common-mode) level $P_o$.

The terms "air" and "pneumatic" and "gaseous fluid" are intended to be interpreted broadly to include the various appropriate gaseous media capable of being economically employed to inflate tension actuators, for example air, mixtures of gases or individual gases, nitrogen, carbon dioxide, and the like.

In accordance with the present invention in one of its embodiments there is provided a gaseous-fluid-pressure actuated, elongated jointed arm having a longitudinal axis and capable of being moved about in various controlled directions, comprising: a plurality of rigid elements located at respective positions spaced along the axis of the arm, each of these elements extending across the axis and having first and second projections protruding outwardly on opposite sides of the axis, all of the first projections being on a first side of said axis and all of the second projections being on the second side of said axis. Each of these elements is oriented generally perpendicular to the neighboring portion of the longitudinal axis at the respective position where the element crosses the axis. There are a plurality of elongated rigid links extending longitudinally along the axis, with respective ones of these links extending along the axis between successive elements, and with one end of each link having a pivoted relationship with the adjacent element. There are first and second pluralities of fluid-inflatable tension actuators, and each of these tension actuators has an inlet end and an outlet end. The tension actuators of the first plurality are joined end-to-end, forming a first inflatable string with the outlet end of each actuator communicating with the inlet end of the next actuator in the first string, and with the outlet end of the last actuator in the first string being blocked. The tension actuators of the second plurality are joined end-to-end forming a second inflatable string with the outlet end of each actuator communicating with the inlet end of the next actuator in the second string, and with the outlet end of the last actuator in the second string being blocked. The first string of tension actuators extends generally parallel with the axis of the arm and is offset from the axis on the first side of the axis, while the second string of tension actuators extends generally parallel with the axis and is offset from the axis on the second side thereof. The first string of tension actuators is anchored to the first projections of said elements, with respective anchoring connections being located at the ends of tension actuators in said first string, and the second string of tension actuators is anchored to the second projections of said elements with each respective anchoring connection being located at the ends of tension actuators in the second string. Pressurized gaseous fluid control means communicate with the inlet ends of the first and second strings for controllably inflating these rings with pressurized fluid controllably varying in opposite directions from a common pressure level $P_o$ for causing the jointed arm to move and bend in various directions.

BRIEF DESCRIPTION OF THE DRAWINGS

The various features, objects, aspects and advantages of the present invention will become more fully understood from a consideration of the following detailed description in conjunction with the accompanying drawings, which are not drawn to scale but are arranged for clarity of illustration. In these drawings:

FIG. 1 is a longitudinal sectional view of a jointed arm including a plurality of strings of air-inflated tension actuators acting in opposition to each other for producing controlled movements through controlled curvature and bending of the arm. FIG. 1 is a section taken along the line 1—1 in FIG. 2.

FIG. 2 is a cross-sectional view of the jointed arm of FIG. 1, being a section taken along the plane 2—2 in FIG. 1.

FIG. 6 is an enlargement of a portion of FIG. 1 included within the dashed and dotted circle for illustrating one embodiment of the pivotal joints in the arm.

FIG. 7 is a view similar to FIG. 6 and illustrating another embodiment of the pivotal joints in the arm.

FIG. 8 is a longitudinal sectional view of a portion of a jointed arm similar to FIG. 1, except that the pivotal joints have line contact, and therefore they act like hinges for allowing swinging movement of the arm back and forth along predetermined arcs of movement in a predetermined plane.

FIG. 9 is a cross-sectional view of the jointed arm of FIG. 8, being a section taken along the plane 9—9 in FIG. 8.

FIG. 10 is a perspective view of a major portion of one of the links of the arm of FIGS. 8 and 9.

FIG. 11 illustrates a further embodiment of a pivotal joint for use in the arm of FIGS. 8 and 9.

FIG. 12 is a perspective view of a major portion of the type of link used with the joints of FIG. 11.

FIG. 13 shows a further embodiment of an elongated jointed arm operated by opposed pairs of pneumatic tension actuators.

FIG. 14 is an enlarged sectional view showing the couplings between successive tension actuators in a jointed arm.

FIG. 15 is an enlarged sectional view showing in greater detail the ball-and-socket pivotal joint corresponding to the embodiment depicted in FIG. 5.

FIG. 16 illustrates a further embodiment of the compression-carrying link in the form of a compression element constructed as a pressurized chamber sealed by a fiber-reinforced elastomeric oblate surface of revolution.

FIG. 17 shows in cross-section yet another embodiment of the compression element in the form of a pressurized flexible annular shell, shaped like a laterally-compressed tire inner-tube.

FIG. 22 shows a useful embodiment employing two jointed-arm sections connected end-to-end and terminating in a gripper, all of which are independent open-loop proportional controlled.

FIG. 25 explains that fluid-driven tension actuators are in general prolate in configuration. At A on the left, the tension actuator is shown partially contracted. At B on the right, the tension actuator is shown more fully contracted caused by increasing the pressure of the internal fluid, as indicated by the longer internal arrows illustrating fluid pressure acting against the flexible side wall of the tension actuator.

FIG. 26 explains that fluid-driven compression actuators are in general oblate in configuration. At A on the left, the compression actuator is shown partially extended. At B on the right, the compression actuator is shown more fully extended caused by increasing the pressure of the internal fluid, as indicated by the longer internal arrows illustrating fluid pressure acting against the two end walls of the compression actuator.

FIG. 27 explains that fluid-driven compression actuators can also have an accordion or bellows configuration. At A on the left, this bellows-shaped compression actuator is shown partially extended. At B on the right, this compression actuator is shown more fully extended caused by increasing the pressure of the internal fluid, as indicated by the longer internal arrows illustrating fluid pressure acting against the two end walls of this accordion-shaped compression actuator.

DETAILED DESCRIPTION OF REFERRED EMBODIMENTS

Figure 3:
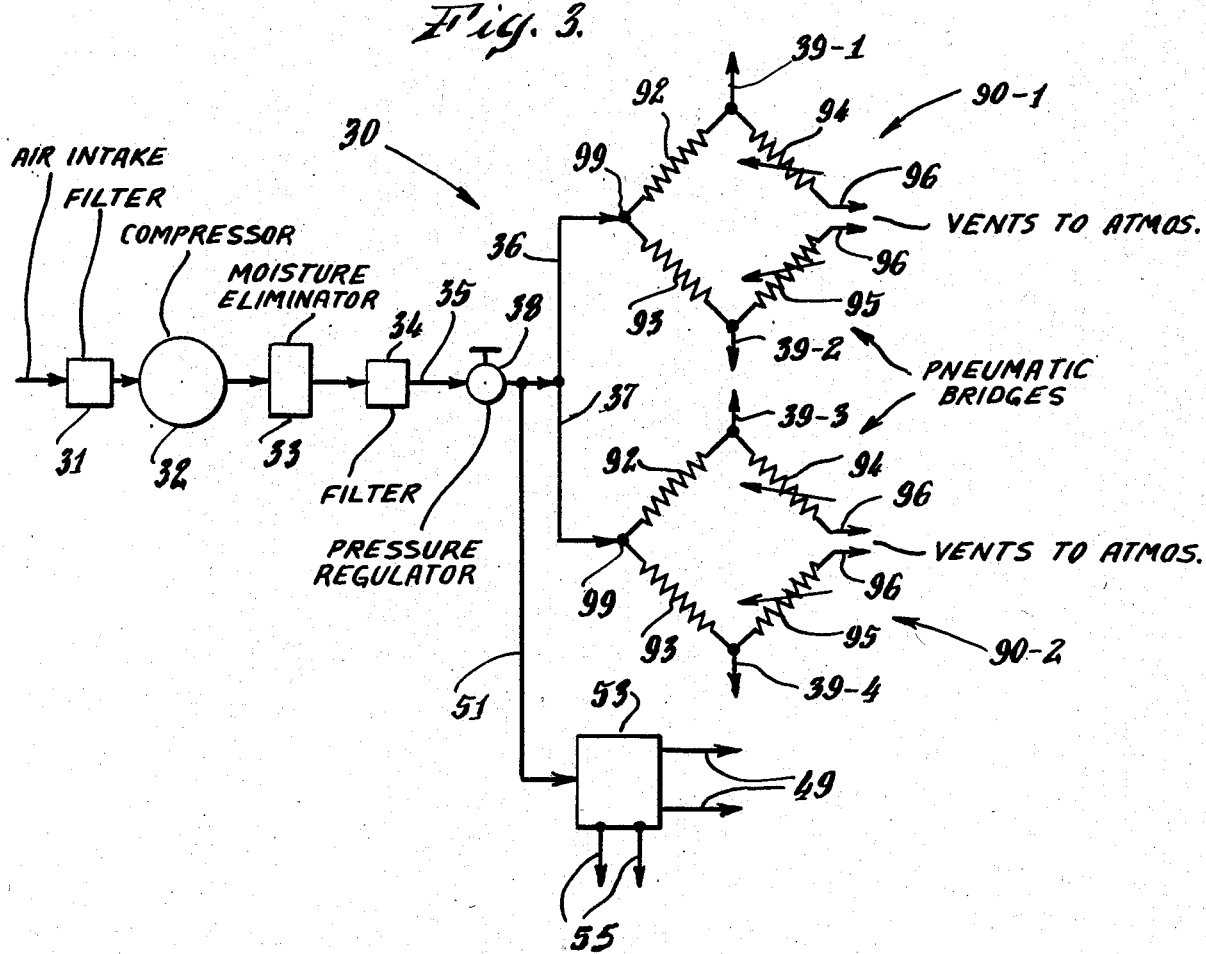
FIG. 3 is a schematic diagram of a controllable source of pressurized gaseous fluid, for example air at various pressures for controlling contraction and elongation of the strings of tension actuators. For clarity of illustration, electrical resistance symbols and variable resistance symbols are shown in FIG. 3 for explaining operation of the controllable air source.

Inviting attention to FIGS. 1 and 2, there is shown an elongated jointed arm 20 having an inner end 21 and an outer or remote end 22. The inner end 21 of the arm is mounted upon a support 24, for example such as the body of a robot having a base or frame 26 A controllable source 30 of pressurized gaseous fluid located near the support 24 serves to control the arm motions, as will be explained later The outer end 22 of the arm 20 is shown carrying an article-handling mechanism 40 for grasping, handling or manipulating objects or articles, as will be explained later In lieu of this article-handling mechanism 40, the outer end of the elongated jointed member 20 may carry any suitable termination, for example in the case of a jointed leg, a termination such as a friction foot is used with a wear resistant sole for engaging the floor or the ground; in the case of a jointed antenna or elephant trunk, the termination 40 includes a suitable sensor, which may be a mechanical proximity or contact or shape sensor or shape tracer; the sensor may be an optical, thermal, magnetic, electrical or radiation sensor. When the jointed member 20 is an arm, the termination 40 can be a hand having a suction palm; and when this jointed member 20 is a leg, the termination 40 can be a foot having a suction sole. Such a "suction palm" or "suction sole" contains one or more suction cups each having a resilient object-gripping or surface-gripping flexible lip. The pressure of the gaseous fluid within each suction cup is controllable through a flexible conduit communicating with the interior of the suction cup.

After the lip of the suction cup has been placed in contact with an object or surface (such as a floor or wall) to be gripped, the internal pressure is reduced below ambient pressure level, thereby providing a suction grip. In order to release this suction grip, the pressure of the gaseous fluid within the suction cup is raised near to or above ambient. The termination 40 may be a suitable tool, for example, such as a paint spray gun welding tool or grasping or manipulating tool, and this termination may comprise one or more sensors plus one or more tools in cooperative association with each other. In cases where the jointed member 10 is employed as a column or beam in a frame or structure, then the termination 40 is a mechanical fastening or coupling for attaching the outer end 22 of this column or beam to another frame member or structural element.

Finally, the termination 40 may in turn comprise an extended additional sequence of elongated jointed-arms, like 20 itself, joined in various ways, and constructed with similar or different dimensions and controlled by a variety of supplied pressures. A particular embodiment with two jointed arm sections 20F and 20G connected end-to-end is portrayed in FIG. 22.

In summary the elongated jointed member 20 may carry any suitable termination means 40 or combinations thereof on its outer end 22, as appropriate for the installation and usage of this jointed member 20 in various applications.

Extending along the longitudinal axis of the arm 20 is a sequence of elongated rigid links 50-1, 50-2, 50-3, 50-(n−1) and 50-n, where "n" is the number of jointed sections in the arm 20. Each of these links 50 is formed of strong, lightweight material, for example aluminum or fiber-reinforced plastic, and each link is shown having the shape of a round rod, preferably of tubular configuration for minimizing weight, mass and inertia while maximizing rigidity, with conically pointed or tapered ends. It is noted that the links 50 can have any desired cross-sectional configuration for optimizing strength and rigidity for resisting deflection under axial compression, for example such as an extruded H-shape or star shape, or square, rectangular, triangular or hexagonal shape, and so forth; and in each case, these links 50 are configured for maximizing strength and rigidity while minimizing weight, mass and inertia.

As shown most clearly in FIG. 6, the pointed or tapered ends 52 of each link 50 are received in a centrally located socket indentation 54 located in the adjacent face of a rigid, generally square (See FIG. 2) plate element 60. As shown in FIG. 1, there are a plurality of these plate elements 60-1, 60-2, (60-(n−1), and 60-n, with each of these plate elements 60 being positioned near the adjacent pointed end of the successive links 50 along the length of the arm 20. The last plate element 60-n is located at the outer or remote end 22 of the arm and carries the termination means 40. Thus, each link 50 has a pivotal mounting 52, 54, 60 at one of its ends.

FIG. 7 illustrates an alternative embodiment of the pivotal mountings at the ends of the respective links 50. These ends 52 are rounded and are received in axially aligned socket indentations 54 located in the adjacent faces of the rigid plate elements 60.

Figure 5:
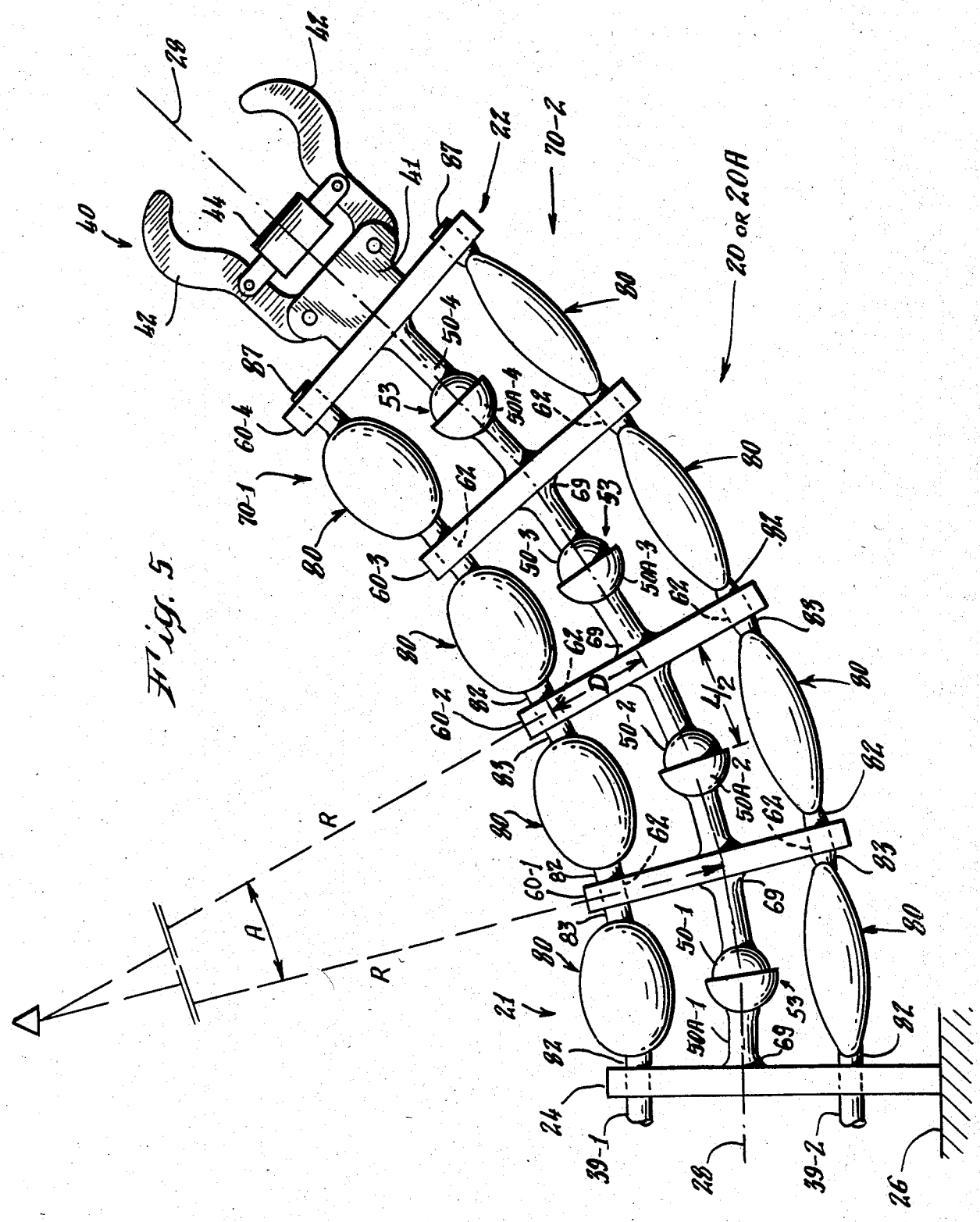
FIG. 5 illustrates movement of the various embodiments of the jointed arm shown in FIGS. 1-4 and in FIGS. 6-12.

It is noted that regardless of the specific shape of the tapered link ends 54, as seen in FIGS. 6 and 7, they are tapered inwardly toward the longitudinal arm axis 28 for causing the tip of each tapered end 52 to have a small area of contact with the center of each socket 54, which is aligned with the axis 28 for defining and forming a pivot point 56 on the axis 28. Moreoever, the sockets 54 each flares outwardly away from the axis 28 for providing clearance for enabling the links 50 to move or swing into various angular positions relative to these plate elements 60, as illustrated in FIGS. 5 and 15, where ball and socket joints 53 are indicated.

Each of the plate elements 60 is formed of strong, lightweight material similar to that used to make the links 50 for the same reasons, as before, namely for minimizing weight, mass and inertia while maximizing strength and rigidity. The links 50 are fixed to the plate elements 60 at 69. It is noted that in order to reduce the weight and mass of the generally square or round or conveniently shaped plate elements 60, they may have cut-outs (not shown). Such cut-outs are not shown in FIG. 2 for clarity of illustration, and because the use of weight-reducing cut-outs is known for inclusion in lightweight but strong, rigid mechanical elements In the embodiments indicated in FIGS. 16 through 20 and 22, the end plates 60 are taken to be circular.

In order to produce controlled motion of the arm 20, there are four strings 70-1, 70-2, 70-3 and 70-4 (FIG. 2) of pneumatic, inflatable tension actuators 80. These tension actuators 80 are constructed as described and shown in U.S. Pat. No. 3,645,173 of John M. Yarlott, or as shown in my copending U.S. patent application Ser. No. 754,423. Such tension actuators 80 have the advantageous operating characteristic that inflation causes them to increase in their enclosed cross-sectional area and volume while simultaneously decreasing (contracting) in their axial length. In other words, as they bulge, they contract in their axial length. Conversely, when such tension actuators are deflated, i.e. as they become more slim, they elongate. The disclosures of these two references are incorporated herein by reference, and the reader is invited to read them to appreciate more fully the desirable qualities of lightweight, low mass, quick response, reliability, long life, simplicity and economy, which are provided by such tension actuators 80.

It is noted that these tension actuators 80 are symmetrical end-to-end, and they each include an inflatable, elastomeric bladder (envelope or impermeable skin) 81 with a pair of end fittings 82 and 83 attached to this elastomeric bladder at each end. These sleeve-like end fittings 82 and 83 define axial passages or ports 84 and 85, respectively, communicating with the interior region 86 of the bladder 81 for enabling the bladder to be inflated or deflated. The two end fittings 82 and 83 in each tension actuator 80 are identical, and their axial passages or ports 84 and 85 are identical. However, for clarity of explanation, it is useful to describe that end fitting 82 and its passage or port 84 of each actuator that is located nearer to the controlled, pressurized air supply 30 as being the input end and input passage (input port), while that other end fitting 83 and its passage or port 85 that is farther from the controlled air supply 30 is described as being the outlet end and outlet passage (outlet port). It will be understood that during inflation of the respective actuator strings 70-1, 70-2, 70-3 and 70-4, air flows from the source 30 through four respective air conduits or air lines 39-1, 39-2, 39-3 and 39-4/into the input end 82 of the first tension actuator of the respective actuator strings 70, and through the actuator interior region 86 and thence through its outlet end fitting 83 into the input end fitting 82 of the next successive actuator in the respective string 70, and so forth.

Thus, the strings 70-1, 70-2, 70-3 and 70-4 of tension actuators 80 are formed by coupling successive tension actuators together in end-to-end relationship with the passage or port 85 in the outlet end fitting 83 of each actuator in the string communicating with the inlet passage or port 84 in the inlet end fitting 82 of the next successive tension actuator in the string. The outlet passage 85 in the last tension actuator 80 in each string 70 is plugged air-tight at 87.

The inflatable bladders 81 each includes longitudinally extending, relatively inextensible filaments or strands of strong flexible high tensile strength material, for example such as Kevlar plastic, polyester, or polypropylene, as described in detail in the references above. These longitudinal filaments or strands are attached to the tubular end fittings 82, 83 for causing these end fittings to be pulled toward each other as the bladder 81 is inflated for producing axial contraction of the tension actuator.

In order to control motions of the arm 20, the four actuator strings, in clockwise (FIG. 2) order around the arm axis 28, referenced as 70-1, 70-3, 70-2 and 70-4, are offset from the arm axis 28, as seen most clearly in FIG. 2, and they are uniformly spaced apart 90° around the axis 28, being near the four rounded/corners of the square plate elements 60. The first actuator string 70-1 on a first side of the arm axis 28 operates in opposition to the second actuator string 70-2 spaced 180° away, namely, on the other or second side of the axis. Similarly, the third actuator string 70-3 on one side of the axis 28 operates in opposition to the fourth actuator string 70-4 spaced 180° away on the opposite side of the axis. In summary, these four actuator strings are operated as two opposed pairs.

These actuator strings 70-1, 70-3, 70-2 and 70-4 are fastened (anchored) to the respective corners of the plate elements 60 by connecting the end fittings 82, 83 to apertures 62 in these plate elements. For example, the respective end fittings 82,83 are air-tight cemented or bonded in end-to-end relationship in the respective apertures 62. An alternative assembly procedure is to use screw-threaded coupling sleeves 87 and 89 is in FIG. 14) for coupling together the respective end fittings 82, 83. Such coupling sleeves are fitted by airtight threaded connections 102 into the apertures 62 in the plate elements 60, as shown in FIG. 14.

The gripping mechanism 40 (FIG. 1) is shown as including a bracket 41 secured to the outer face of the outer plate element 60-n. A pair of opposed gripping fingers or jaws 42 are hinged to the bracket 41 by pivot pins 43. For opening and closing these grippers 42, there is a double-acting cylinder and piston assembly 44 having its piston rod 45 pivotally pinned at 46 to one gripper 42. The cylinder has a mounting rod 47 pivotally pinned at 48 to the other gripper 42. A pair of flexible air lines 49 communicates with the cylinder 44 at opposite ends. Feeding pressurized air through one of the lines 49 into one end of the cylinder 44 causes the grippers 42 to close toward each other, and conversely to open when pressurized air is fed through the other line into the other end of the cylinder 44. These flexible air lines 44 are strung through holes 64 (FIG. 2) in the plate elements 60 located near the arm axis 28. Air source 30 (FIG. 3) includes line 51 supplying regulated pressurized air to pneumatic controller 53 connected to air lines 49 for operating the article handler 40. There are electrical leads 55 connected from the controller 53 to a control panel 100 (FIG. 4) including a microprocessor for automatic operation of the article handler 40.

In FIG. 3 is shown the controlled pressurized air supply 30 comprising an intake air filter 31, communicating with ambient air and connected into an air compressor 32, whose output passes through a moisture eliminator 33, and through a further filter 34 capable of removing fine particles from the compressed air. From the output of filter 34 an air supply line 35 leads to a pressure regulator 38 whose regulated output feeds into two branches 36, 37 which feed into two pneumatic bridge networks 90-1 and 90-2, which are analogous to electrical Wheatstone bridges.

Each bridge network 90 includes a pair of pressure-dropping flow resistors 92 and 93 and a pair of remotely controllable pressure-dropping flow resistors 94 and 95 whose outlets are vented to atmosphere at 96.

Figure 4:
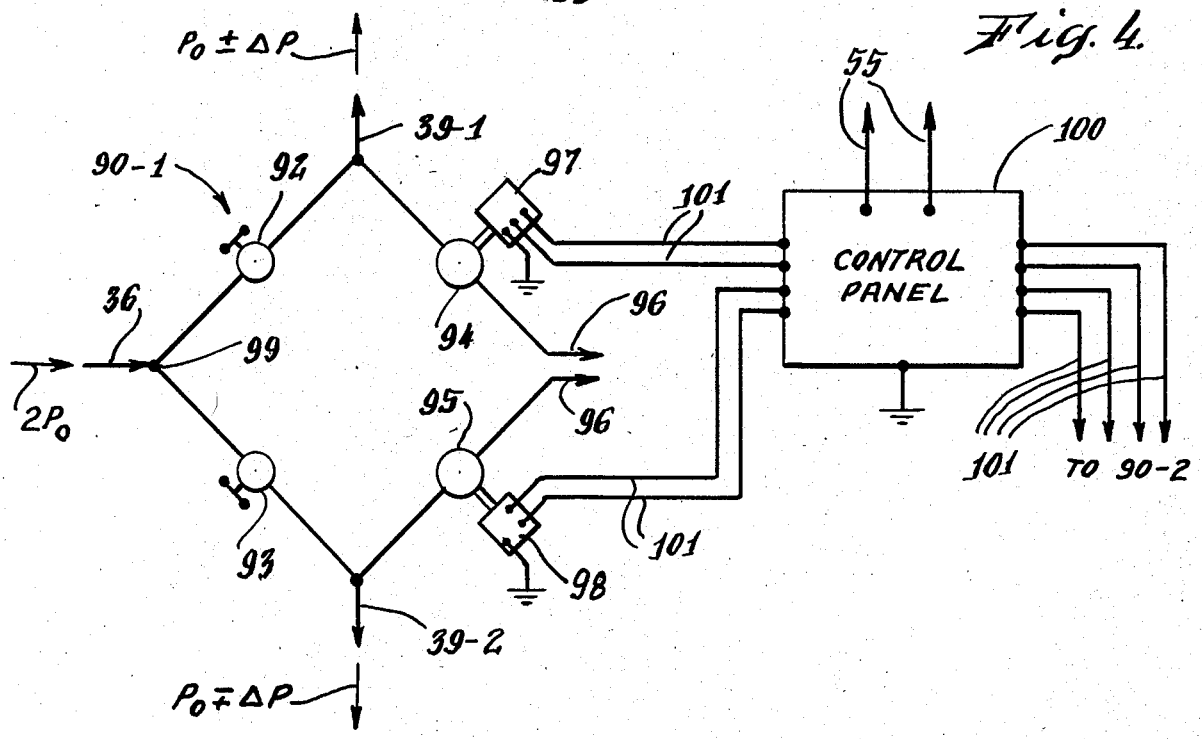
FIG. 4 is an enlargement of a portion of the diagram of FIG. 3 in which mechanical symbols replace the electrical symbols for further explanation of the illustrative embodiments, and showing the control system.

As shown in FIG. 4, the pressure-dropping flow resistors 92 and 93 are manually adjustable valves each providing a flow-impeding orifice, for example needle valves. The remotely controllable pressure-dropping flow resistors 94 and 95 are needle valves which are controllably adjusted by electric actuators 97 and 98, respectively, for example solenoid or else reversible stepping motors.

The output supply line 39-1 is connected to the bridge 90-1 at the juncture of components 92 and 94, while the second output supply line 39-2 is connected to the opposite side of this pneumatic bridge at the juncture of components 93 and 95. Similarly, the third and fourth output supply lines 39-3 and 39-4 are connected to the respective corresponding junctures located on opposite sides of the other pneumatic bridge 90-2. Consequently, the pressures of the air being fed through the four respective output supply lines 39-1, 39-2, 39-3 and 39-4 are remotely controllable by varying the settings of the needle valves 94 and 95 in the two pneumatic bridges 90-1 and 90-2.

The operation of these two pneumatic bridges 90-1 and 90-2 will now be explained. The pressure regulator 38 is set to supply a regulated air pressure of $2P_o$ (FIG. 4) through the two branch lines 36 and 37 into the input junctions 99 of the two bridges 90-1 and 90-2. The four pressure-dropping flow resisting components 92, 93, 94 and 95 in each bridge are all initially set the same. Consequently, one-half of the pressure drop occurring from the input junction 99 to the vent 96 will take place in the components 92 and 93, and the other half of the pressure drop will take place in the components 94 and 95. The result is that the initial output pressure in all four of the output supply lines 39-1, 39-2, 39-3 and 39-4 will be the same, namely, one-half of the input pressure of $2P_o$. Thus, the initial pressure in lines 39-1, 39-2, 39-3 and 39-4 is $P_o$, which is called the initial supply pressure level.

This initial supply pressure level of $P_o$ may be at any desired gage pressure, where atmospheric pressure is taken as zero p.s.i. gage, in the range from 3 p.s.i.g. up to 120 p.s.i.g. depending upon the burst strength limit of the individual tension actuators 80.

When the pressure-dropping flow resistance of the component 94 in the bridge 90-1 is increased from its initial value, more than one-half of the total pressure drop occurring from the input junction 99 to the vent 96 now occurs across this component 94. Consequently, the pressure now appearing in the output line 39-1 is greater than $P_o$. The larger the pressure drop occurring in the component 94, the nearer the pressure in the output line 39-1 approaches the $2P_o$ regulated pressure level at the input junction 99.

Conversely, when the pressure-dropping flow resistance of the component 94 in the bridge 90-1 is decreased from its initial value, less than one-half of the total pressure drop now occurs across this component 94. Thus, the pressure now appearing in the output line 39-1 is less than $P_o$. The smaller the pressure drop occurring in the component 94, the nearer the pressure in the output line 39-1 approaches the zero gage pressure of the atmospheric vent 96.

The motors 97 and 98 (FIG. 4) are connected for adjusting the components 94 and 95 in a bridge 90 in opposite directions. Consequently, the output pressures appearing in the two output lines 39-1 and 39-2 (and also in the two output lines 39-3 and 39-4) vary in opposite directions from the initial pressure level $P_o$. Preferably, these controllable pressure-dropping components 94 and 95 are arranged to produce equal and opposite pressure increments $\Delta P$ above and below the initial pressure level $P_o$; so that the pressures in the two output lines 39-1 and 39-2 (and also in the two output lines 39-3 and 39-4) have values of $P_o + \Delta P$.

This type of control with the tension actuators 80 and tension actuator strings 70 working in opposition and their internal pressures being varied by equal increments of pressure $\Delta P$ above and below a common mode pressure level $P_o$ may be called a "push-pull" control operating system, keeping in mind that the tension actuators themselves are always exerting tension (not compression) forces.

A nearly uniform stiffness or mechanical output impedance of the motions of the arm 20 is advantageously obtained by controlling the pressures in the bridge output lines 39-1 and 39-2 (and also in the other bridge output lines 39-3 and 39-4) to vary by equal increments $\Delta P$ in opposite directions from the initial common-mode pressure level $P_o$. Moreover, by controlling the opposed tension actuator strings with a common mode pressure level $P_o$ and by equal and opposite increments of pressure $\Delta P$ above and below $P_o$, these actuator strings are always exerting a net compressive force on each joint, so advantageously permitting usage of simple, inexpensive, lightweight, noncapturing joints as shown in FIGS. 6, 7, 8 and 11, and moreover there is produced a controllable stable constant curvature of the elongated jointed member 20, 20A, C, D, E, F or G, as will be explained later. In other words, an advantageous open loop proportional control is achieved.

The jointed arm 20 automatically returns and comes to rest at an intermediate linear or angular position, for example, it returns to straight, as shown in FIG. 1, when the pressures in the four supply lines 39-1, 39-2, 39-3 and 39-4 are returned to their initial equal common-mode values of $P_o$.

Figure 21:
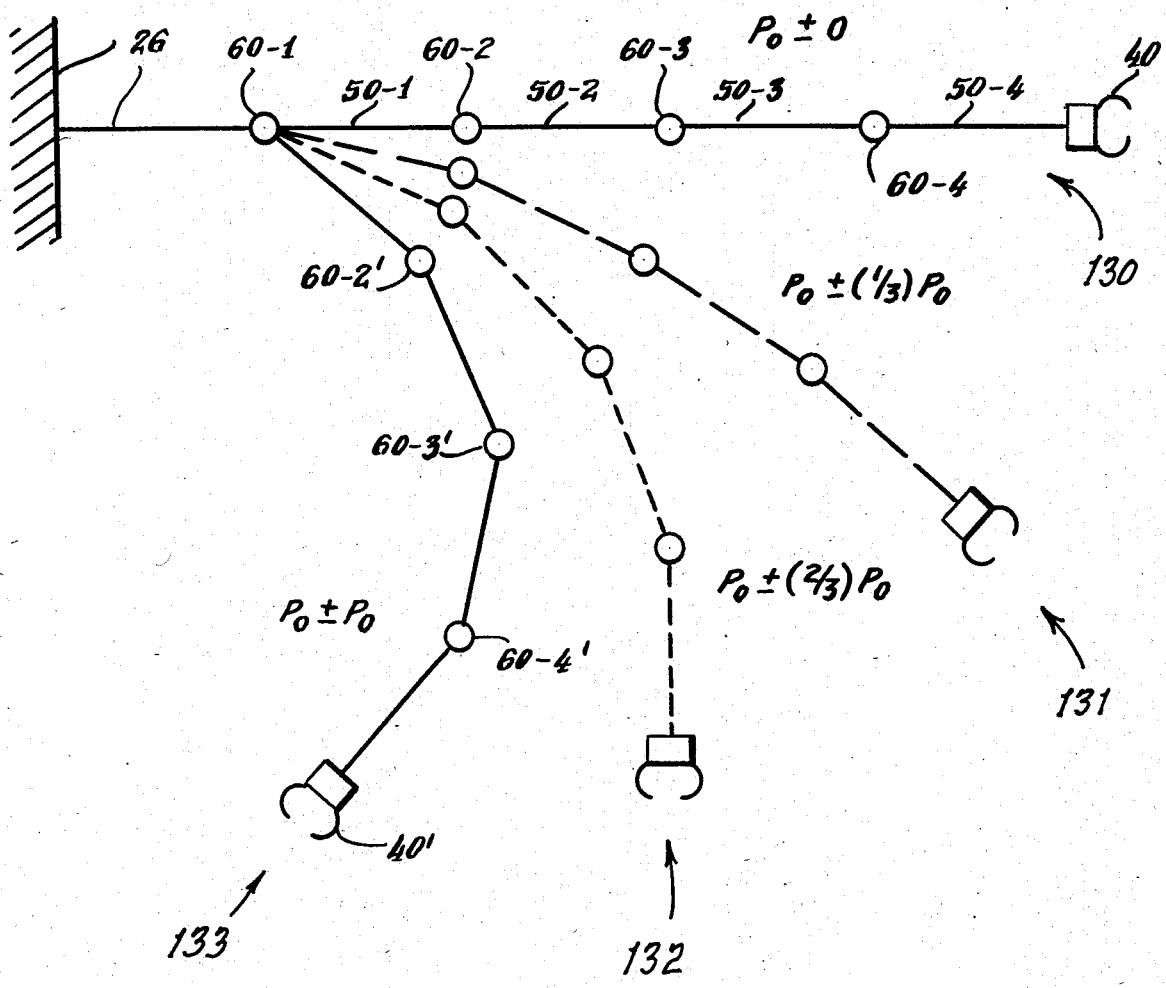
FIG. 21 indicates the variation in constant curvature and resulting movement of a multi-section embodiment obtained by virtue of using tension actuators as the control pressures are varied in an open loop proportional control method and system.

As shown in FIG. 5, when the pressure being supplied to the actuator string 70-2 is decreased below $P_o$, the actuators 80 in this string 70-2 become elongated, causing the string 70-2 as a whole to elongate, while the pressure being supplied to the opposing actuator string 70-2 is increased above $P_o$, causing this latter string as a whole to contract, thereby producing bending motion of the jointed arm 20. Thus, it will be understood that by varying the settings of the components 94 and 95 in the bridges 90-1 and 90-2, the jointed arm 20 can be caused to bend and move in any desired direction from the initial straight position shown in FIG. 1. A sequence of such positions each having a constant curvature along the length of the jointed member 20, 20A, C,D,E,F or G is shown in FIG. 21. The control motors 97, 98 in the two pneumatic bridges 90-1 and 90-2 are connected by electrical leads 101 to the control panel 100 which contains a microprocessor for automatically controlling movements of the jointed arm (jointed member) 20.

It is to be noted that unlike piston-type linear pneumatic actuators, and unlike vane-type rotary pneumatic actuators, and unlike compression actuators, the opposed pneumatic (gaseous fluid operated) tension actuators 80 provide the unique and advantageous feature of coming to rest at a predetermined intermediate specific position of the jointed arm 20 depending directly upon the opposed fluid pressures supplied to respective opposed strings 70 for actuators 80, i.e., a desirable predetermined and accurately predictable stable open loop proportional control is produced. Therefore, as the source 30 under control of the panel 100 is programmed to supply pressurized air at $P_o + \Delta P$ and $P_o - \Delta P$, respectively, to the opposed actuator strings 70-1, 70-2 and 70-3 and 70-4, the various controlled positions of the arm 20 will vary in a predeterminable relationship with the various specific values of the pressure increments $\Delta P$, as shown in FIG. 21. In other words, the various controlled positions of the arm 20 are predictable because the curvature is a nearly linear function of variation of the controlled pressure increments, thereby reducing complexity and cost. For example, position sensors or proximity sensors and electronic feedback controls plus complex valving are not needed. Further, this feature of predictable and uniformly curved response of arm movements as a function of variations in the pressure increments $\Delta P$ also provides an advantageous nearly uniform stiffness, i.e. a very nearly uniform bending, stiffness, for all positions of the arm 20.

In the elongated arm 20A shown in FIGS. 8 and 9 there are peg and groove socket joints 58, 54A, thus producing swinging movement of the jointed arm sections in a plane. As shown in FIG. 10, the links 50 have transverse round rigid rod-like peg elements 58 attached to each end, forming a generally I-shaped or H-shaped configuration, depending upon the relative length of the transverse joint elements 58 in proportion to the length of the axial link 50.

The rigid plate elements 60A have a generally diamond or rhombus-shape configuration, and there are two opposed actuator strings 70-1 and 70-2 fastened to apertures 62 located near the opposed tip portions of the plate elements 60A. It will be understood that the controlled pressurized air supply 30 for this arm 20A includes only one pneumatic bridge 90-1 (FIG. 3) for operating the two opposed tension actuator strings 70-1 and 70-2. The transverse pivot elements 58 are shown oriented perpendicular to a straight line passing through the centers of the apertures 62. The socket indentations 54A are grooves extending for the full length of the transverse elements 58, and these grooves include barriers 59 at each end for preventing the peg elements 58 from inadvertently sliding along the grooves 54A in this pivotal mounting 58, 54A, 60A. By making the groove socket 54A with a larger radius of curvature than the rounded surface of the pivot element 58, a low-friction, straight-line-contact 66 pivot action is provided.

In lieu of the peg and groove socket type of pivotal mounting 58, 54A, 50A, shown in FIGS. 8, 9 and 10, a knife-edge 58A and groove 54A pivotal mounting can be used, as shown in FIGS. 11 and 12. The transverse rigid elements 58A have a triangular cross-sectional shape. The apex of this triangular pivot element 58A engages in the socket groove 54A for providing a very low-friction, straight-line 66 of pivot contact.

In the jointed arm 20B (FIG. 13) there are opposed pairs of pneumatic tension actuators 80-1, 80-2 and 80-3, 80-4 which are offset away from opposite sides of the longitudinal axis 28 of the arm 20B. The inner end 21 of this arm 20B is pivotally mounted upon a support 24, 26, for example such as a robot body, and the outer end 22 carries suitable termination means 40. The rigid links 50B-1 and 50B-2 each includes round rigid transverse peg elements 58 at their respective inner ends, which form pivotal joints by seating in non-capturing groove socket indentations 54A, similar to those shown in FIGS. 8 and 9. These grooves 54A extend for the full length of the transverse pivot elements 58, and these grooves 54A include barriers at each end for preventing the pivot elements 58 from inadvertently sliding along the grooves 54A, similar to the barriers 59 (FIG. 9). Thus, it will be understood that the link elements 50B-1, 58 and 50B-2, 58 have generally a T-shaped configuration, with the stem 50B extending axially along the arm axis 28 and constituting the shank of the T and with the transverse pivot element 58 extending perpendicular to the plane in which lies the arm axis 28 and constituting the cross bar of the T.

In order to attach the tension actuators 80, there are rigid attachment or anchoring elements 60B projecting out on opposite sides of the arm axis 28 and oriented about the axis 28 at 90° relative to the length of the pivot elements 58. In other words, these attachment elements 60B lie in the same plane as the arm axis 28. Near the elbow region 23, one of these attachments 60B' lies on the axis 28 of the inner link 50B-1.

The tension actuators 80 have their inner and outer end fittings 2, 83 attached by strong flexible tension cords 88 to the respective attachments 60B and 60B'. The passage or port in th outer end fitting 83 of each actuator is plugged air-tight at 87. The passage (port) in the inner end fittings 82 of the respective actuators 80-1, 80-2, 80-3 and 80-4 communicate with the four respective pressurized air supply lines 39-1, 39-2, 39-3 an 39-4 (FIGS. 3 and 4). Thus, the first pneumatic bridge 90-1 i employed to control the two opposed tension actuators 80-1 and 80-2 for controlling movements of the inner section of th arm 20B, this inner section being the portion between the shoulder region 21 and the elbow region 23. The second pneumatic bridge 90-2 is employed to control the two opposed tension actuators 80-3 and 80-4 for controlling movements of the outer section of this arm 20B, this outer section being the portion between the elbow region 23 and the wrist region 22. The motions o the whole arm 20B are thereby advantageously controlled automatically in accordance with the programming of the microprocessor in the control panel 100. Consequently, the advantageous common-mode pressure control method is achieved for this arm 20B with all of the resulting desirable features as explained before, namely: (1) the arm comes to rest, i.e. it always assumes predeterminable (predictable) intermediate specific portions depending directly upon the differences in the opposed fluid pressures being supplied to the opposed pairs of actuators 80-1 and 80-2, 80-3 and 80-4; in other words, depending directly upon the various specific values (magnitudes) of the pressure increments $\Delta P$; (2) the various controlled positions of the arm will vary in a nearly linear relationship as a function of, i.e. in response to, the various specific values, i.e. the magnitudes, of the present increments ΔP; (3) a nearly uniform stiffness of the arm is achieved at all of its positions; and (4) a nearly uniform output impedance is achieved for all positions of the arm, i.e. a desirable predetermined and accurately predictable stable open loop proportional control is produced.

It is noted that the various pivotal mountings as described above advantageously involve simple, non-capturing, inexpensive, lightweight, low-friction types of pivot mounts having low-friction point contact or line contact pivot action. This ability o utilize these non-capturing type of pivot mounts is provided because the opposed pneumatic actuators 80 operated in the method, a described, always produce a net compressive force on the pivots, as described above.

It is to be understood that capturing types of pivotal socket joints can be employed in the jointed arm 20, 20A and 20B, if desired. Such capturing types of pivotal mountings are, for example, ball and socket joints 53, where the ball is captured in the socket and hinge pin joints, where the hinge pin is captured within encircling portions of the hinged elements, for example, as in cupboard door hinges. The ball-and-socket joints 53 shown in FIGS. 5 and 15 could be either the capturing or noncapturing type.

It will be understood from FIGS. 5 and 14 that when the end fittings 2 and 83 are fastened into the apertures 62 of the plate element 60 or 60A, then bending of the jointed arm 20 or 20A is accommodated by flexing of the bladders 81 in the respective pneumatic tension actuators 80.

One final comment about advantages in the use of pneumatic (gaseous fluid) tension actuators 80: they operate in accordance with the First Law of thermodynamics (energy conservation), namely, tension force "F" times differential change in length, i.e. differential contraction, "dx" equals inflation pressure "P" times differential volume "dv":

$$F \cdot dx = P \cdot dv \tag{1}$$

Solving for tension force gives:

$$F = P(dv)/(dx) \tag{2}$$

Figure 23:
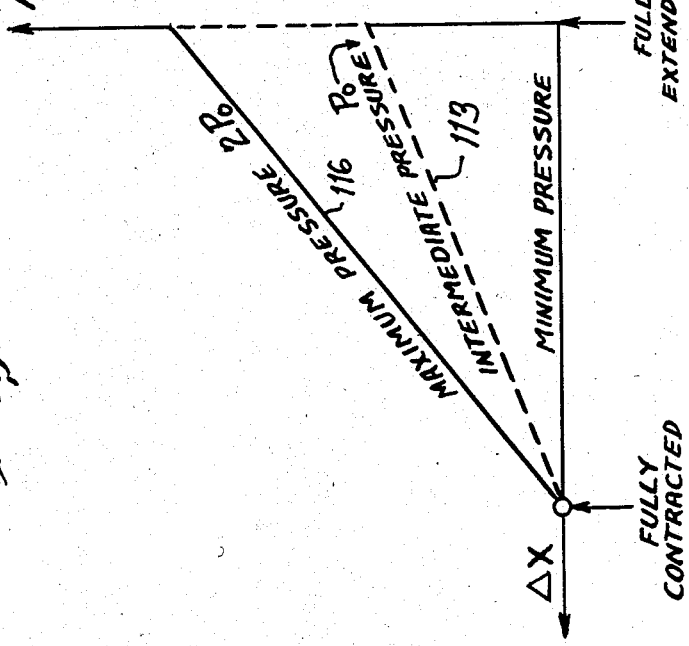
FIG. 23 graphs the proportional variation in tension actuator spring-rate with actuator supply pressure.

Therefore, the tension force F is directly proportional to the inflation pressure P within the interior region 86 of each bladder 81 multiplied by the incremental rate of change of volume dv with respect to incremental rate of change in length dx of the actuator. When the bladder 81 and its longitudinal strands or filaments are architectured for maintaining dv/dx substantially constant throughout the range of contraction, then the tension force F at each point along any one of the straight operating characteristic lines 113 or 116 (FIG. 23) is directly proportional to the inflation pressure P as shown in FIG. 23. In other words, the tension actuators act like linear-characteristic tension springs in accordance with Hook's Law; when fully extended the tension force F is maximum, and when fully contracted the tension force is minimum. The values of X are shown in FIG. 23 as negative (to the left) because a contraction is produced.

When according to my invention, as disclosed above and claimed below, the tension actuators 80 and tension actuator strings 70 are used in opposition, the relation between control pressures of equal increments (±ΔP) above and below and resulting curvature (±K) follows necessarily from the geometric constraint:

$$\text{Curvature } K = 1/R = A/L = X/DL, \tag{3}$$

where R, A, L, and D are as indicated in FIG. 5 and ΔX is as shown in FIG. 23.

Figure 24:
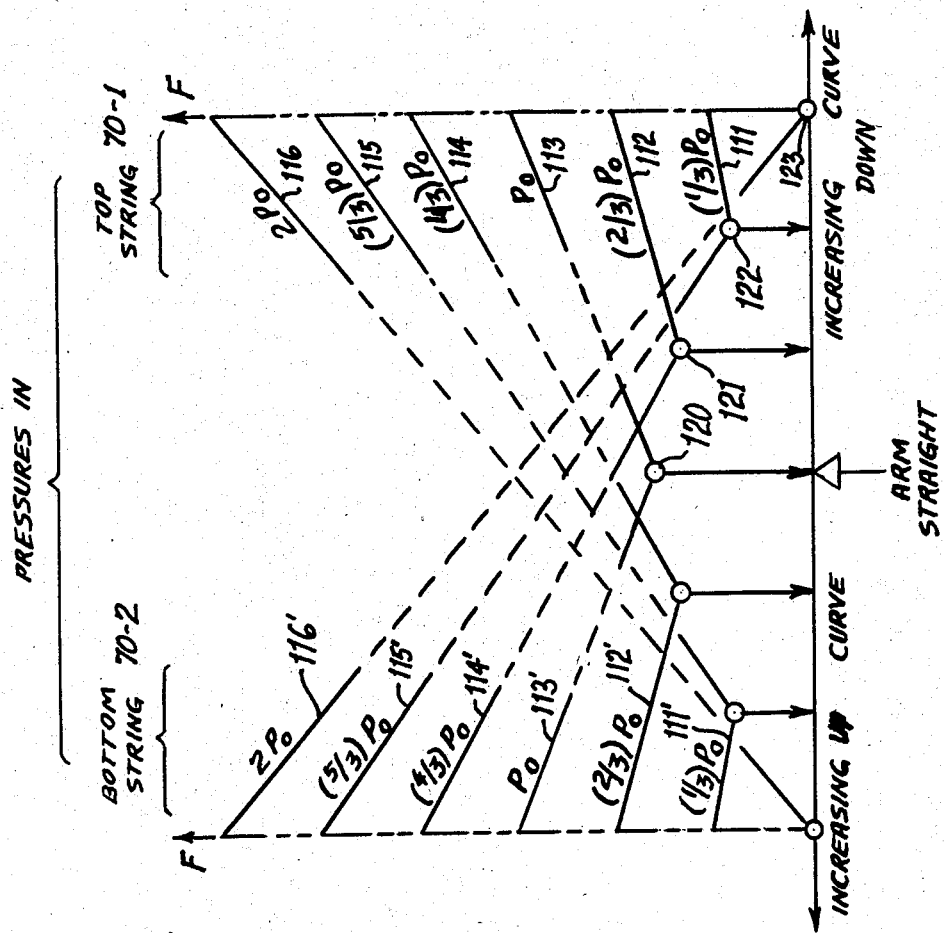
FIG. 24 indicates quantitatively how the push-pull operation of the opposed tension actuator strings advantageously yields stable open-loop proportional control of arm curvature, such curvatures being constant or uniform along the arm length, as portrayed in FIGS. 5, 21 and 22.

It is to be noted that FIG. 24 is derived from FIG. 23. The operating characteristic lines 111, 112, 113, 114, 115 and 116 in FIG. 24 for the top string 70-1 of tension actuators are plotted for the respective pressures $\frac{1}{3}P_o$, $\frac{2}{3}P_o$, $P_o$, $\frac{4}{3}P_o$, $5/3\ P_o$ and $2P_o$. The operating characteristic lines 113 and 116 in FIG. 24 are seen to correspond with the same operating characteristic lines 113 and 116 in FIG. 23. One difference is that FIG. 24 includes the plots of six operating characteristic lines 111 through 116 instead of only two lines 113 and 116. The other difference is that FIG. 24 also includes the six plots 111′, 112′, 113′, 114′, 115′ and 116′ for the bottom string of tension actuators 70-2. Since this second string 70-2 is acting in opposition to the first string 70-1, this second group of six plots 111′ through 116′ slopes downwardly toward the right.

When the operating pressures are equal to $P_o$ in both tension actuator strings, then the two operating characteristic lines 113 and 113′ apply to the situation. These two lines intersect at the point 120 in the center of the plot, thus producing a stable straight condition for the jointed member 20, 20A, 20C, 20D, 20E, 20F or 20G as shown in FIG. 21 at 130.

When the operating pressure in the top string is decreased to $\frac{2}{3}P_o$ while that in the bottom string is increased to $4/3\ P_o$, then the operating characteristic lines 112 and 114′ in FIG. 24 apply to the situation. The intersection of lines 112 and 114′ is at point 121, thus producing the stable predetermined and accurately predictable modest curved position 131 (FIG. 21) for the jointed member. There is an effectively constant (uniform) curvature along the length of this jointed member, i.e. each joint is bent at the angle, which follows from the equal and opposite pressure increments of $\pm(\frac{1}{3})\ P_o$ acting in the Hooke's Law tension actuators, as is explained in connection with equation (3) above.

When the operating pressure in the top string is further decreased to $\frac{1}{3}P_o$, while that in the bottom string is increased to $5/3\ P_o$, then the operating characteristic lines 111 and 115′ in FIG. 24 apply, thereby giving an intersection at point 122, thus producing the stable predetermined and accurately predictable greater curved position 132 (FIG. 21) for the jointed member.

When the operating pressure in the top string is decreased even further to zero in FIG. 24 while that in the top string is increased to $2P_o$, the intersection point of line 116′ and zero pressure is at 123, thus producing the stable predetermined and accurately predictable greatest curved position 133 (FIG. 21).

In summary of FIGS. 21 and 24, stable open loop proportional control is advantageously produced by these embodiments of the jointed member 20, 20A, 20C through 20G. The same open loop proportional control is produced in the jointed arm or leg 20B of FIG. 13, but constant or uniform curvature is not provided in such a two-jointed member.

Also, FIGS. 16 through 20 show useful embodiments where the compression-carrying links 50 are embodied in suitable oblate or toroidal compressive air-springs (or compression air-actuators). Jointed-arms in this form have particular value if the arms must be compactly stowed when not in use, because the bladders 181 of the compression actuators 50C, 50D or 50E can be deflated and collapsed. The tension actuators 80 also can be collapsed when deflated, thereby producing a compact overall collapsed assembly which is easy to stow and carry.

In FIG. 16, there are circular plate elements 60C having central links 50 fixed to these plate elements. In order to provide a pivot connection between the ends of successive links 50, there are bendable compression actuators 50C each having an inflatable flexible elastomeric bladder 181 with a pair of flat end fittings 182. Each end fitting 182 is attached or seated on the end of a link 50. Such a compression actuator 50C acts contrary to the tension actuators 80, because its axial length increases as the pressure of the gaseous fluid within the bladder 181 is increased, as will be explained further later.

The tension actuators 80 in FIG. 16 in the strings 70-1 and 70-2 are shown in dashed outline for focusing attention on the compression actuator 50C. If desired to inflate and deflate the bladder 181 and the bladders of the other similar actuators 50C in the jointed member 20C, there is provided an axial passage 189 (FIG. 26) extending through all of the links 50 and communicating with the interiors of all of the bladders 181 which are air-tight to prevent leakage. Thus, these compression actuators 50C can be deflated for collapsing and compactly stowing the jointed member 20C, if desired. Alternatively, if it is not desired to inflate and deflate the bladder 181, they can be pre-filled with a predetermined pressure of gaseous fluid and permanently sealed, in which event the links 50 and end plates 182 need not have an axial passage 189 (FIG. 26).

In the jointed member 20D in FIG. 17, each compression actuator 50D is shaped generally like a tire inner tube and encircles the four neighboring tension actuators 80 (only three are seen) in the four strings 70-1, 70-2, 70-3 (70-4 is not seen). The perimeters of the circular plate elements 60D have annular seat surfaces 184 for mounting the bladder 183 of the toroidal or generally inner tube shaped compression actuator 50D. The tension actuators 80 re shown in dashed outline in FIG. 17 to focus attention on the compression element 50D.

In FIGS. 16 and 17, the reason why the compression actuator 50C or 50D, respectively, is shown bent away from a symmetrical configuration is that the tension actuators 80 in the upper string 70-1 are being contracted in axial length relative to the tension actuators 80 in the lower string 70-2 by a relative increase in the pressure of the fluid within the upper string 70-1.

It is to be understood that in accordance with "Steiner's Symmetrization Principle" each of these compression bladders 181 and 183 is continually striving to restore itself to a maximally symmetric configuration and will, in fact, become restored to a maximally symmetric configuration when allowed to be in the neutral (equilibrium) state. Consequently, when the opposed pairs of tension actuators 80 in FIG. 16 are exerting equal tension forces, the compression actuator 80C will then take the shape of an oblate spheroid having flat parallel end plates 182 at its flattened poles, and the jointed member 20C as a whole will then be extending straight. Similarly, when the opposed pairs of tension actuators 80 in FIG. 17 are exerting equal tension forces, the compression actuator 80D will then take the shape of a symmetric torus or inner tube being somewhat flattened by contact with the annular seats 184, and the jointed member 20D as a whole will then be extending straight.

The toroidal bladder 183 in FIG. 17 has been prefilled with a predetermined quantity of pressurized gaseous fluid, usually air, and then was sealed air-tight.

Figure 18:
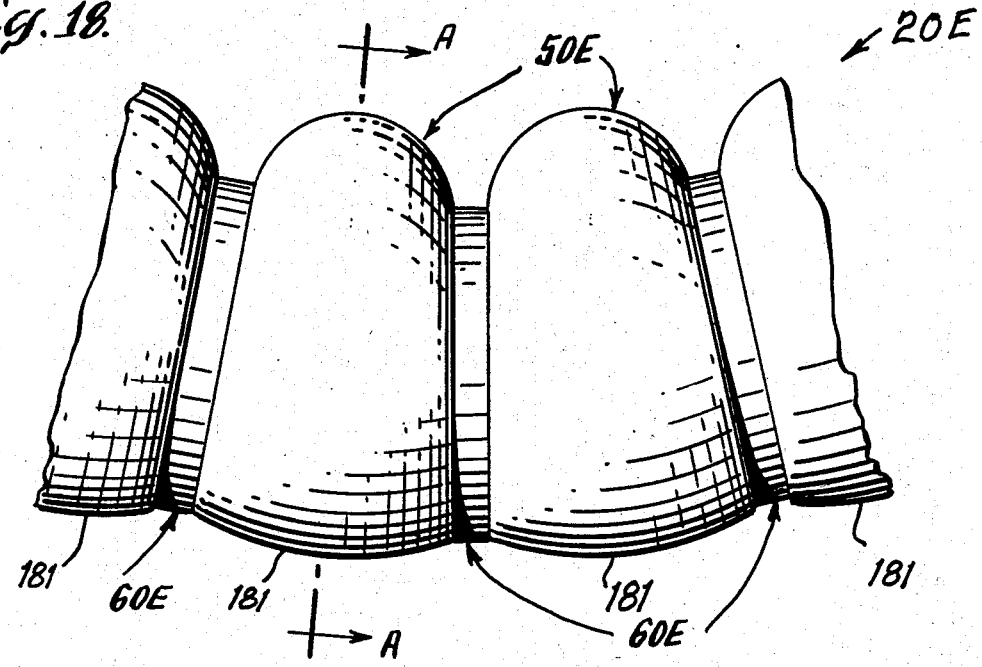
FIG. 18 depicts an advantageous embodiment of my invention wherein the compressive load is carried by a pressurized cell formed by an air-tight membrane envelope extending between rigid circular end-plates and completely enclosing the tension actuator contained within.
Figure 19:
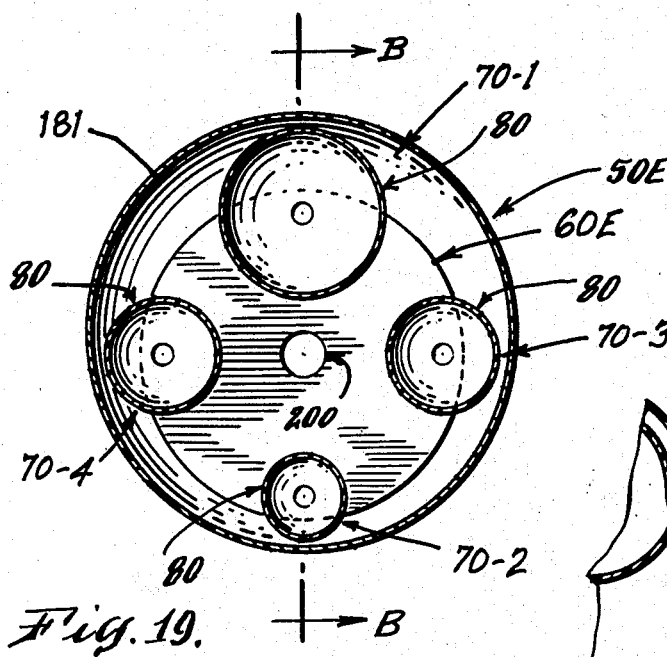
FIG. 19 shows a cross-sectional view of the jointed-arm embodiment illustrated in FIG. 18, being a section taken along the plane A—A of FIG. 18.
Figure 20:
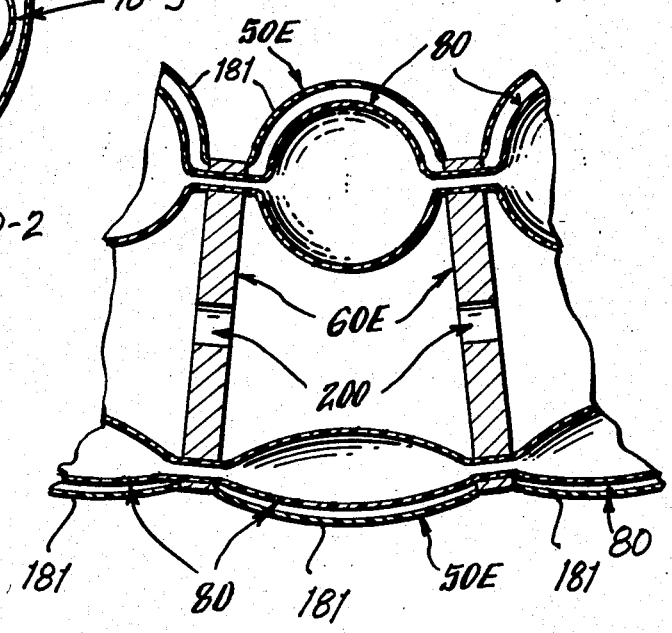
FIG. 20 represents a longitudinal interior view of the same jointed-arm embodiment shown in FIGS. 18 and 19, being a cross-section taken along the plane B—B of FIG. 19.

In FIGS. 18, 19 and 20 are shown components of a jointed member 20E. The plate elements 60E are circular. These plate elements 60E serve as the anchoring or attachment elements for the tension actuators 80 in the four strings 70-1, 70-3, 70-2 and 70-4. Each of the compression actuators 50E has a prolate spheroidal bladder 181. The successive plate elements 60E along the length of the jointed member 20E serve as end fittings (Please note end fittings 182 in FIG. 16) for the respective intervening compression actuators 50E, and the bladder 181 is anchored to the perimeter of each plate element 60E.

The reader will appreciate that in FIG. 16 the compression actuator 50C is located between the four tension actuators 80 in each stage or section of the jointed member 20C; whereas, in FIGS. 18, 19 and 20, each compression actuator 50E encloses or contains the four tension actuators 80 in its stage or section of the jointed member 20E. Thus, advantageously the bladder wall 181 can also serve as the skin for the jointed member 20E.

In order to inflate or deflate the compression actuators 50E, the plate elements 60E have central apertures or ports 200. The reason why the jointed member 20E is bent in these FIGS. 18, 19 and 20 is that the tension actuators 80 in the upper string 70-1 are being contracted in axial length relative to the tension actuators 80 in the lower string 70-2 by a relative increase in pressure of the fluid within the upper string 70-1. In accordance with Steiner's Symmetrization Principle, each of the compression actuators 20E will take the equilibrium shape of an oblate spheroid having flat parallel end fittings 60E at its poles when the tension forces being exerted by the two opposed pairs of tension actuators are equal, and the jointed member 20E as a whole will then be extending straight.

In FIG. 22, the jointed upper arm 20F and the jointed forearm 20G can be constructed using any of the jointed members 20, 20A, 20C, 20D or 20E. In using jointed members 20E or 20D, the bladders 181 or 183, respectively can also serve as the skin for the upper arm 20F and forearm 20G, if desired. An outer protective flexible skin covering can be applied, if desired, for protection of these bladders. In using the jointed members 20, 20A or 20C, a generally tubular skin is incorporated by attaching this skin to the peripheries of the plate elements 60, 60A or 60C.

FIG. 25 shows that tension actuators 80 have a prolate configuration. When the pressure of the internal fluid is increased, as shown by the longer arrows 192 in B at the right, as compared with arrows 191 in A at the left, the bladder wall 81 of the tension actuator bulges. There is a consequent axial contraction $\Delta X$, thereby producing a tension force as shown by the arrows T.

FIG. 26 shows that compression actuators have an oblate configuration. When the pressure of the internal fluid is increased, as shown by the longer arrows 194, as compared with the arrows 193, the end fittings 182 are driven further apart. There is a consequent axial elongation $\Delta X$, thereby producing a compression force as shown by the arrow C.

FIG. 27 illustrates that compression actuators 50C' can also have a bellows or accordion configuration. An increase in the pressure of the internal fluid, as shown by the longer arrows 194 pushes the end fittings 182 farther apart. There is a consequent axial elongation ΔX, thereby producing a compression force as shown by the arrows C.

Figure 28:
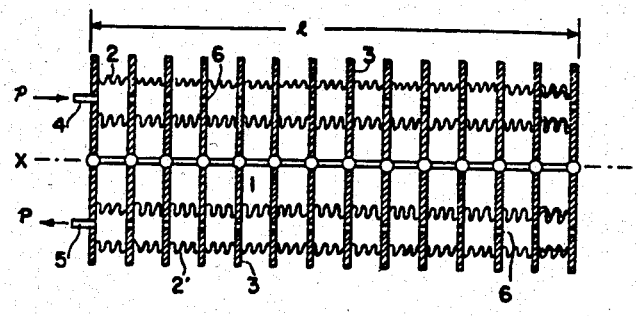
FIG. 28 shows a flexible beam structure or flexible arm similar to that shown in FIG. 1 of U.S. Pat. No. 3,284,964 of Saito including bellows-type compression actuators.

FIG. 28 corresponds generally with FIG. 1 of U.S. Pat. No. 3,284,964 - Saito, and the reference numbers are the same as used by Saito.

Saito states that the conduit means 4 and 5 connect "the bellows 2 and 2' to a supply of pressure through a controlling system". In FIG. 5 of Saito such a control system is shown to include control valves for isolating the bellows 2 and 2' from the source of supply for trapping fluid in the bellows for preventing collapse of either of the bellows when subjected to a compressive load greater than that which would be supported by the pressure of the source of supply. In other words, the pressure in the trapped fluid rises above the pressure level of the supply source thereby to resist collapse. This increased internal pressure is indicated as "P₃" in column 2, lines 59–69.

Figure 29:
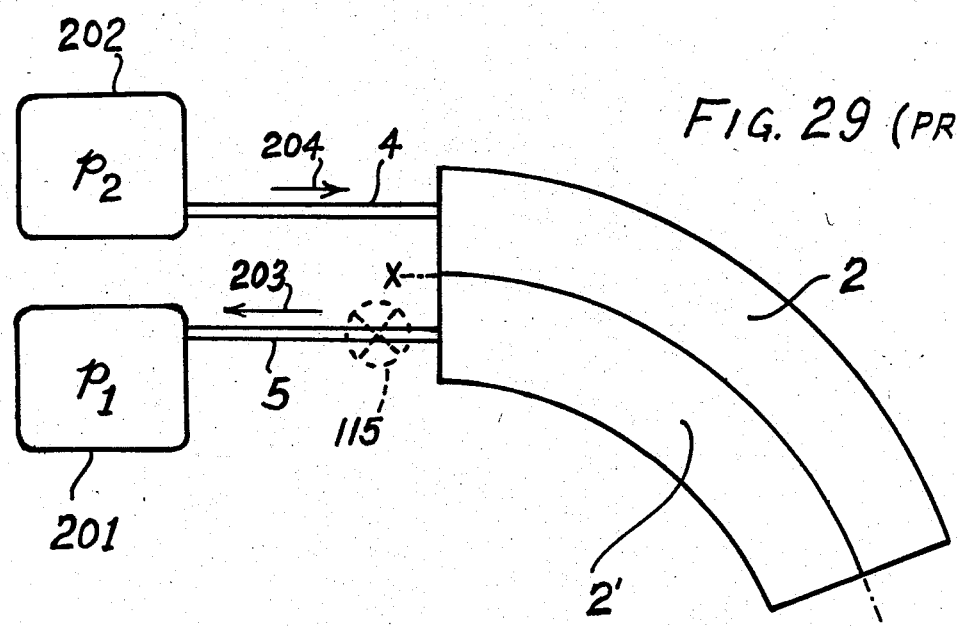
FIG. 29 is an illustration for explaining that a flexible beam or flexible arm will NOT give stable "open loop proportional control" with compression actuators. Such a structure will collapse on the side containing the lower pressure fluid, if communication remains continuously open to the lower pressure fluid source. In order to obtain stable control with compression actuators the fluid is in effect metered into the compression actuators, and then shut-off valves are used as shown in FIG. 5 of the above-referenced Saito patent for capturing (trapping) the fluid in the compression actuators, thereby isolating the trapped fluid from the pressure in its original supply source. Consequently, pressure in the trapped fluid can rise in the side of the beam or arm which otherwise would collapse, thereby preventing collapse, but such valving and trapping is not open loop proportional control.

FIG. 29 illustrates that when a jointed structure such as shown in FIG. 28 or FIG. 1 of Saito is operated by compression actuators (such as bellows) the whole structure is unstable and will collapse on the low pressure side if each string of bellows remains continuously in communication with its supply source. In other words, open loop proportional control is impossible, i.e. is inoperative, with opposed strings of compression actuators.

For example, the pressure "P₁" in the first pressurized fluid supply source 201 is less than the pressure "P₂" in the second pressurized fluid supply source 202. Consequently, the bellows string 2' will collapse as shown in FIG. 29. The higher pressure level P₂ will dominate over the lower pressure level P₁ and thus will keep on inflating and expanding (elongating) the higher pressure bellows string 2 as shown by the flow arrow 204, while at the same time the lower pressure bellows string 2' will keep on collapsing (contracting) as the lower pressure fluid is forced to flow out from the bellows string 2' into the lower pressure supply source as shown by the arrow 203.

The way to prevent this collapse of the bellows string 2' is to put a shut-off valve shown dotted at 115 into the conduit 5 and to close this valve 115 for isolating the bellows string 2' from its supply source 201, thereby allowing the pressure within this bellows string 2' to increase above its supply source pressure P₁ for thereby resisting collapse. But, the use of shut-off valves and all of their attendant controls is not open loop proportional control. Furthermore, because the position of a jointed member driven by opposed pairs of compression actuator strings is unpredictable, elaborate position sensors and closed loop feedback control is needed, which is entirely different from the present invention.

Moreover because liquid is relatively incompressible as compared with gaseous fluids, such compression actuator strings in a jointed arm may be controlled hydraulically rather than pneumatically by metering fixed liquid quantities into the actuator strings for positioning of the arm. But such strings of compression actuators in an arm, when filled with hydraulic liquid cause such an arm to be needlessly heavy and very sluggish in its movements, Yet, if in order to remove this mass disadvantage gaseous fluid were to be substituted for liquid in the compression actuator strings, similar fixed quantities of such fluids would not yield directly corresponding arm positions due to the inherent compressibility of the fluids and the resultant creep action and sensitivity to variations of load on the arm.

Finally, then, according to my invention, substitution of tension actuators for compression actuators when controlled by open-loop pressure sources make possible ultralight controllable structures and devices useful, say, for space stations and factories; these advantages are novel and not hitherto available.

Corresponding reference numbers are used throughout the various FIGURES for indicating the same elements and for indicating elements which perform corresponding functions even though their physical structures or shapes may be somewhat different.

While the novel features of the invention have been illustrated and described in connection with specific embodiments of the invention, it is believed that these embodiments will enable others skilled in the art to apply the principles of the invention in forms departing from the exemplary embodiments herein, and such departures are contemplated by the appended claims and equivalents of the claimed elements.

I claim:

1. A fluid-pressure actuated elongated jointed member having a longitudinal axis and capable of being moved about in various controlled directions, comprising:

a plurality of rigid elements located at respective positions spaced along said axis, each of said elements extending across the axis and having first and second projections projecting outwardly on opposite sides of the axis, all of said first projections being on a first side of said axis and all of said second projections being on the second side of said axis, said second side being opposite to said first side, each of said elements being oriented generally perpendicular to the neighboring portion of the longitudinal axis at the respective position where the element crosses the axis, a plurality of compression-carrying links positioned concentrically along the axis, respective ones of said links extending between successive elements, each link being rigidly connected to an element and having a pivotal relationship with the adjacent element, first and second pluralities of fluid-inflatable tension actuators, each of said tension actuators having an inlet end and an outlet end, the tension actuators of the first plurality being joined end-to-end for forming a first inflatable string with the outlet end of each actuator in said first string communicating with the inlet end of the next actuator in said first string, and with the outlet end of the last actuator in said first string being blocked, means for feeding pressurized fluid into the inlet end of said first string of tension actuators, the tension actuators of the second plurality being joined end-to-end for forming a second inflatable string with the outlet end of each actuator in said second string communicating with the inlet end of the next actuator in said second string, and with the outlet end of the last actuator in said second string being blocked, means for feeding pressurized fluid into the inlet end of said second string of tension actuators, the first string of tension actuators extending generally parallel with said axis and being offset from said axis on the first side of said axis, the second string of tension actuators extending generally parallel with said axis and being offset from said axis on the second side of said axis, said first string of tension actuators being fastened to the first projections of said elements with respective fastening connections being located near ends of tension actuators in said first string, and said second string of tension actuators being fastened to the second projections of said elements with respective fastening connections being located near ends of tension actuators in said second string.

2. A fluid-pressure actuated jointed member as claimed in claim 1, and in which:

pressurized fluid control means communicates with the inlet ends of the first and second strings of tension actuators for inflating said first and second strings with pressurized fluid controllably varying by equal pressure increments $\Delta P$ in opposite directions from a common pressure level $P_o$ for causing the jointed member to move into various positions coming to rest at various predetermined predictable positions depending directly upon the various specific values of the pressure increments $\Delta P$.

3. A fluid-pressure actuated jointed member as claimed in claim 2, in which:

said pressurized fluid control means comprises:

a source of pressurized air at regulated pressure, four pressure-dropping flow resisting components connected to form a four-sided pneumatic bridge network having four corners, with an inlet junction and a vent to atmosphere located at two opposite corners of said bridge and wherein there are two junctions located at the respective other two opposite corners of the bridge forming first and second outlets from the bridge, said source of pressurized air is connected to said inlet junction for supplying pressurized air at regulated pressure to the bridge, the first pressure-dropping flow resisting component located between said inlet junction and said first outlet is equal in effect to the second pressure-dropping flow resisting component located between said inlet junction and said second outlet, the third pressure-dropping flow resisting component is located between said first outlet and said vent, the fourth pressure-dropping flow resisting component is located between said second outlet and said vent, said first and second outlets respectively communicate with said inlet ends of said first and second actuator strings, and variable control means are connected to said third and fourth components for varying their pressure-dropping effects by equal amounts in opposite directions from an initially equal condition.

4. A fluid-pressure actuated jointed member as claimed in claim 2, in which:

ends of the links have low-friction non-captured pivotal relationships with the adjacent elements, and said first and second strings of tension actuators exert a net compressive force on said pivotal relationships in all positions of the jointed member, thereby preventing separation of the links from the elements in spite of being non-captured.

5. A fluid-pressure actuated jointed member as claimed in claim 1, in which:

said elements have pairs of straight grooves facing in opposite directions, said pair of straight grooves in each element are parallel with each other and each groove intersects the longitudinal axis of the jointed member, said pair of parallel straight grooves in each element are oriented perpendicular to a straight line passing through the respective fastening connections on said first and second fastening connections on said first and second projections of the element, and the pivotal relationship of the links with said elements comprises a transverse straight pivot rod on an end of each link rotatably seating in one of said grooves.

6. A fluid-pressure actuated jointed member as claimed in claim 1, in which:

said elements have first, second, third and fourth projections projecting outwardly from the axis and oriented with respect to each other about 90° around the longitudinal axis of the arm, there are first, second, third and fourth pluralities of fluid-inflatable tension actuators respectively joined end-to-end forming first, second, third and fourth strings of tension actuators, said four strings of tension actuators all extend generally parallel with the axis and all are offset from the axis and are located at spaced positions separated from each other about 90° around said longitudinal axis, and said first, second, third and fourth strings of tension actuators being fastened to the respective first, second, third and fourth projections of said elements for bending the jointed member in various directions by varying the internal pressures of the tension actuators in the various strings.

7. A fluid-pressure actuated jointed member as claimed in claim 6, and in which:

first pressurized fluid control means communicates with the inlet ends of the first and second actuator strings second pressurized fluid control means communicates with the inlet ends of the third and fourth actuator strings, said first pressurized fluid control means inflates said first and second actuator strings with pressurized fluid controllably varying by equal pressure increments $\Delta P$ in opposite directions from a common pressure level $P_o$, and said second pressurized fluid control means inflates said third and fourth actuator strings with pressure increments $\Delta P$ in opposite directions from the same common pressure level $P_o$, bending said jointed member in various directions with the jointed member assuming various predictable predetermined positions determined by the various values of the equal and opposite pressure increments $\Delta P$.

8. A fluid-pressure actuated elongated jointed member as claimed in claim 7, in which:

said first pressurized fluid control means and said second pressurized fluid control means each comprises:

a source of pressurized air at regulated pressure, four pressure-dropping flow resisting components connected to form a four-sided pneumatic bridge network having four corners, with an inlet junction and a vent to atmosphere located at two opposite corners of said bridge and wherein there are two junctions located at the respective other two opposite corners of the bridge forming first and second outlets from the bridge network, said source of pressurized air is connected to said inlet junction for supplying pressurized air at regulated pressure to the bridge network, the first pressure-dropping low resisting component located between said inlet junction and said first outlet is equal in effect to the second pressure-dropping flow resisting component located between said inlet junction and said second outlet, the third pressure-dropping flow resisting component is located between said first outlet and said vent, the fourth pressure-dropping flow resisting component is located between said second outlet and said vent, and said first and second outlets of one of said bridge networks respectively communicate with the inlet ends of said first and second actuator strings, and the first and second outlets of the other of said bridge networks respectively communicate with the inlet ends of said third and fourth actuator strings, and variable control means connected to said third and fourth components in each bridge network for varying their pressure-dropping effects by equal amounts in opposite directions from an initially equal condition.

9. A fluid-pressure actuated jointed member as claimed in claim 6, in which:

said elements have a socket aligned with the longitudinal axis, and the pivotal relationship of the ends of the links with said elements comprises ends of the links received in said sockets.

10. A fluid-pressure actuated jointed member as claimed in claim 9, in which:

said ends of said links are tapered and are received in said sockets in low-friction non-captured relationships, and said four actuator strings exert a net compressive force on said tapered ends and sockets in all positions of the jointed member, thereby retaining said tapered ends in said sockets in spite of their non-captured relationship with their sockets.

11. The method for controlling movements of an elongated arm having a longitudinal axis comprising the steps of:

providing a pivotal mounting between one end of said arm and a support, positioning first and second effectively identical fluid-inflatable tension actuators on opposite sides of said arm with said actuators extending generally parallel with the axis and being offset away from the axis on opposite sides of the arm, connecting each tension actuator between the support and corresponding positions on the arm on opposite sides of the arm for causing the tension forces of said actuators acting on the arm to be opposed to each other, inflating the first and second opposed tension actuators with pressurized gaseous fluid controllably varying by equal pressure increments $\Delta P$ in opposite directions from a common pressure level Po for causing the arm to assume various predictable predetermined positions depending directly upon the various values of the pressure increments $\Delta P$, said various predictable predetermined positions of the arm varying in a nearly linear relationship in response to the various specific values of the pressure increments $\Delta P$, and said arm having a nearly uniform stiffness at all of its positions.

12. The method for controlling movements of an elongated arm as claimed in claim 11, including the further steps of:

providing pressurized air at a regulated pressure of $2P_o$, feeding some of such regulated pressurized air through first and second pressure-dropping components in serial relation and venting to atmosphere after flowing through the second component, placing the first tension actuator in communication with a first outlet point in the flow path through said first and second components, such first outlet point being located between said first and second components, feeding some of such regulated pressurized air through third and fourth pressure-dropping components in serial relationship and venting to atmosphere after flowing through the fourth component, placing the second tension actuator in communication with a second outlet point in the flow path through said third and fourth components, such second outlet point being located between said third and fourth components, initially setting the pressure-dropping effects of said first, second, third and fourth components to be equal for providing pressurized air at the same common pressure level $P_o$ from said first and second outlets, and controllably varying the pressure-dropping effects of said third and fourth components in opposite directions from their initial effects for causing the pressurized air supplied from said first and second outlets to said first and second tension actuators to vary in opposite directions by equal pressure increments $\Delta P$.

13. A fluid-pressure actuatable elongated jointed arm having an axis extending along the length of the arm, said arm being capable of reaching in various controlled directions, comprising:

base means, a plurality of elongated links arranged in sequence in end-to-end relationship along the length of the axis of said arm, the first of said links in said sequence being positioned near said base means and the last of said links in said sequence being positioned remote from said base means, the first of said links having a pivotal mounting to said base means for enabling said first link to swing into various angular positions relative to said base means, each successive link in said sequence having a pivotal mounting to the preceding link in said sequence for enabling each successive link to swing into various angular positions relative to the preceding link, a plurality of rigid elements, respective ones of said rigid elements being connected to the respective pivotal mountings between links, said rigid elements projecting out on opposite sides of said axis,
a first plurality of fluid-inflatable tension actuators connected in sequence in end-to-end relationship with each actuator in the sequence communicating with the next successive actuator forming a first inflatable string of tension actuators,
a second plurality of fluid-inflatable tension actuators connected in sequence in end-to-end relationship with each actuator in the sequence communicating with the next successive actuator forming a second inflatable string of tension actuators,
the first string of tension actuators extending along the length of the arm and being offset to a first side of the axis,
said second string of tension actuators extending along the length of the arm and being offset to a second side of the axis opposite to said first side,
said first string of tension actuators being attached to the respective rigid elements at attachment positions offset to the first side of the axis,
said attachment positions being located along the first string at points located between tension actuators in the first string,
said second string of tension actuators being attached to the respective rigid elements at attachment positions offset to the second side of the axis, and
said latter attachment positions being located along the second string at points located between tension actuators in the second string.

14. A fluid-pressure actuatable elongated jointed arm as claimed in claim 13, in which:
controllable pressurized fluid supply means communicates with said first and second strings of tension actuators for controlling inflating said first and second strings of tension actuators with respective first and second sources of pressurized fluid variable oppositely upwardly and downwardly from a common pressure level Po for causing the arm to reach in various directions from said base means.

15. A fluid-pressure actuatable elongated jointed arm as claimed in claim 14, in which:
said first and second sources of pressurized fluid are oppositely varied by equal pressure increments ΔP upwardly and downwardly, respectively, from a common pressure level $P_o$ for causing the arm to reach into various predeterminable predictable specific positions depending directly upon the various magnitudes of the pressure increments ΔP.

16. A fluid-pressure actuatable elongated jointed arm as claimed in claim 14, in which:
said pressurized fluid supply means comprises:
a source of pressurized air at regulated pressure,
four pressure dropping flow resisting components connected to form a four-sided pneumatic bridge network having four corners, with an inlet junction and a vent to atmosphere located at two opposite corners of said bridge and wherein there are two junctions located at the respective other two opposite corners of the bridge forming first and second outlets from the bridge network,
said source of pressurized air is connected to said inlet junction for supplying pressurized air at regulated pressure to the bridge network,
the first pressure-dropping flow resisting component located between said inlet junction and said first outlet is equal in effect to the second pressure-dropping flow resisting component located between said inlet junction and said second outlet,
the third pressure-dropping flow resisting component is located between said first outlet and said vent,
the fourth pressure-dropping flow resisting component is located between said second outlet and said vent,
said first and second outlets respectively communicate with said first and second actuator strings, and
there are control means connected to said third and fourth components for varying their pressure-dropping effects by equal amounts in opposite directions from an initially equal condition.

17. A fluid-pressure actuatable elongated jointed arm as claimed in claim 13, in which:
said rigid elements have first, second, third and fourth projections projecting outwardly from the axis and oriented with respect to each other about 90° around the longitudinal axis of the arm,
there are first, second, third and fourth pluralities of fluid-inflatable tension actuators respectively joined end-to-end forming first, second, third and fourth strings of tension actuators,
said four strings of tension actuators all extend ge ne rally parallel with the axis and all are offset from the axis and are located at spaced positions separated from each other about 90° around said longitudinal arm axis, and
said first, second, third and fourth strings of tension actuators are fastened to the respective first, second, third and fourth projections of said rigid elements for bending the jointed arm in various directions by varying the internal pressures of the tension actuators in the various strings.

18. A fluid-pressure actuatable elongated jointed arm as claimed in claim 18, in which:
a first pneumatic bridge operates said first and second actuator strings and a second pneumatic bridge operates said third and fourth actuator strings,
said first and second pneumatic bridges each comprises:
a source of pressurized air at regulated pressure,
four pressure-dropping flow resisting components connected to form a four-sided pneumatic bridge having four corners, with an inlet junction and a vent to atmosphere located at two opposite corners of said bridge and wherein there are two junctions located at the respective other two opposite corners of the bridge forming first and second outlets from the bridge,
said source of pressurized air is connected to said inlet junction for supplying pressurized air at regulated pressure to the bridge,
the first pressure-dropping flow resisting component located between said inlet junction and said first outlet is equal in effect to the second pressure-dropping flow resisting component located between said inlet junction and said second outlet,
the third pressure-dropping flow resisting component is located between said first outlet and said vent,
the fourth pressure-dropping flow resisting component is located between said second outlet and said vent, and
the first and second outlets of the first bridge communicate with said first and second actuator strings, respectively and the first and second outlets of the second bridge communicate with said third and fourth actuator strings, respectively, and there are control means connected to said third and fourth components in both of said pneumatic bridges for varying the pressure-dropping effects of the third and fourth components in each bridge by equal amounts in opposite directions from an initially equal condition.

19. A fluid-actuatable elongated jointed arm comprising:
a support for the arm having first and second spaced fastening points,
a first rigid link extending longitudinally along the longitudinal axis of the arm,
said first link being pivotally mounted to said support at a first pivot position intermediate said first and second spaced fastening points,
first and second pneumatically inflatable tension actuators positioned on opposite sides of said link and each having an inlet end and an outlet end,
the inlet end of the first actuator being connected to the first fastening point,
the outlet end of the first actuator blocked and being connected to said link at a third fastening point remote from said pivot mounting,
the inlet end of the second actuator being connected to the second fastening point.
the outlet end of the second actuator being blocked and being connected to said link at a fourth fastening point remote from said pivot mounting,
a second rigid link extending longitudinally along the longitudinal axis of the arm pivotally mounted to the arm at a second pivot position remote from said first pivot position,
fifth and sixth spaced fastening points on said first link on opposite sides of said second pivot position and each being spaced from said second pivot position,
third and fourth pneumatically inflatable tension actuators positioned on opposite sides of said second link and each having an inlet end and an outlet end,
the inlet end of the third actuator being connected to the fifth fastening point,
the outlet end of the third actuator being blocked and being connected to said second link at a seventh fastening point remote from said second pivot position,
the inlet end of the fourth actuator being connected to the sixth fastening point, and
the outlet end of the fourth actuator being blocked and being connected to said second link at an eighth fastening point remote from said second pivot connection.

20. A fluid-actuatable elongated jointed arm as claimed in claim 19 in which:
each of said pivot mountings comprises a peg in a groove pivot.

21. A fluid-actuatable elongated jointed arm as claimed in claim 19, in which:
pressurized fluid control means communicates with the inlet ends of the first, second, third and fourth actuators for inflating said first and second actuators, respectively, and for inflating said third and fourth actuators, respectively, with pressurized fluid controllably varying by equal pressure increments ΔP in opposite directions from a common pressure level $P_o$ for causing the jointed arm to move into various positions coming to rest at various predetermined predictable positions depending directly upon the various specific values of the pressure increments ΔP.

22. A fluid-pressure actuated elongated jointed member having a longitudinal axis and capable of being moved in various controlled directions, comprising:
a plurality of rigid elements located at respective positions spaced along said axis,
each of said elements extending across the axis and having first and second projections projecting outwardly on opposite sides of the axis, all of said first projections being on a first side of said axis and all of said second projections being on the second side of said axis,
said second side being opposite to said first side,
each of said elements being oriented generally perpendicular to the neighboring portion of the longitudinal axis at the respective position where the element crosses the axis,
a plurality of compression-carrying links positioned concentrically along the axis,
respective ones of said links extending between successive elements,
each link having a pivotal relationship with the adjacent element,
said compression-carrying links comprising a plurality of compressive air springs or air actuators of generally oblate form,
said air springs being constructed so that a decrease of length corresponds to a decrease in internal pressurized volume,
first and second pluralities of fluid-inflatable tension actuators,
each of said tension actuators having an inlet end and an outlet end,
the tension actuators of the first plurality being joined end-to-end for forming a first inflatable string with the outlet end of each actuator in said first string communicating with the inlet end of the next actuator in said first string, and with the outlet end of the last actuator in said first string being blocked,
the tension actuators of the second plurality being joined end-to-end for forming a second inflatable string with the outlet end of each actuator in said second string communicating with the inlet end of the next actuator in said second string, and with the outlet end of the last actuator in said second string being blocked,
the first string of tension actuators extending generally parallel with said axis and being offset from said axis on the first side of said axis,
the second string of tension actuators extending generally parallel with said axis and being offset from said axis on the second side of said axis,
said first string of tension actuators being fastened to the first projections of said elements with respective fastening connections being located near ends of tension actuators in said first string, and
said second string of tension actuators being fastened to the second projections of said elements with each respective fastening collection being located near ends of tension actuators in said second string.

23. A fluid-pressure actuated elongated jointed member as in claim 22, whose compression-carrying links comprise:
a plurality of compressive air springs of generally oblate form,
said air springs completely enveloping the tension actuators contained therein,
and where the pressure supplies for the tension actuators operate so that $P_o \pm \Delta P$ is measured relative to the internal pressure of the compressive air springs or air-actuators.

24. A fluid-pressure actuated elongated jointed member having a longitudinal axis and capable of being moved about in various controlled directions, comprising:
  a plurality of rigid elements extending across the axis at spaced positions along the axis, forming a succession of such elements,
  a plurality of fluid-actuatable tension actuators,
  each of said tension actuators having an inflatable flexible bladder extending between two spaced ends and said ends of each actuator having a passage therein providing communication with the interior of the bladder through each end,
  said tension actuators being arranged in communication end-to-end forming first and second strings of tension actuators,
  said first and second strings being positioned on opposite sides of said axis with respective tension actuators so connected to said rigid elements as to form pairs of opposed tension actuators between successive rigid elements, and
  compression-carrying means positioned concentrically with respect to the axis and between successive rigid elements so as to provide pivotal joints between successive rigid elements.

25. A jointed member as claimed in claim 23, in which:
  said compression-carrying means are pivotal links.

26. A fluid-pressure actuated elongated jointed member as claimed in claim 25, in which:
  said pivotal links provide swinging movement in three dimensions,
  said tension actuators are arranged in communication end-to-end forming third and fourth strings of tension actuators,
  said third and fourth strings are positioned on opposite sides of said axis with respective tension actuators of said third and fourth strings so connected to said rigid elements as to form pairs of opposed tension actuators between successive rigid elements, and
  said first, second, third and fourth strings are arranged in order first, second, third and fourth around said axis for enabling movement of said elongated jointed member in three dimensions of movement by controllably inflating said first, second, third and fourth strings of tension actuators.

27. A fluid-pressure actuated elongated jointed member as claimed in claim 24, further comprising:
  another plurality of fluid actuatable tension actuators,
  each of said tension actuators of said another plurality having an inflatable flexible bladder extending between two spaced ends and said ends of each actuator having a passage therein providing communication with the interior of the bladder through each end,
  said tension actuators of said another plurality being arranged in communication end-to-end forming third and fourth strings of tension actuators,
  said third and fourth strings being positioned on opposite sides of said axis with respective tension actuators of said third and fourth strings so connected to said rigid elements as to form pairs of opposed tension actuators between successive rigid elements,
  said first, second, third and fourth strings being arranged in order first, second, third and fourth around said axis,
  said compression-carrying means providing pivotal joints enabling said rigid elements to swing into various angular positions in three dimensions, and
  controllable pressurized fluid supply means communicating with the bladders of said first, second, third and fourth strings for moving said elongated jointed member into various positions with three dimensions of movement.

28. A fluid pressure actuated elongated member having a longitudinal axis and capable of being moved about in various controlled directions, comprising:
  a plurality of rigid elements extending across the axis at spaced positions along the axis, forming a succession of such elements,
  a plurality of fluid-actuatable tension actuators,
  each of said tension actuators having an inflatable flexible bladder extending between two spaced ends and said ends of each actuator having a passage therein providing communication with the interior of the bladder through each end,
  said tension actuators being arranged in communication end-to-end forming first and second strings of tension actuators,
  said first and second strings being positioned on opposite sides of said axis with respective tension actuators so connected to said rigid elements as to form pairs of opposed tension actuators between successive rigid elements, and
  compression-carrying means positioned concentrically with respect to the axis and between successive rigid elements so as to provide pivotal joints between successive rigid elements,
  said compression-carrying means being bendable.

29. A fluid-pressure actuated elongated jointed member having a longitudinal axis and capable of being moved about in various controlled directions, comprising:
  a plurality of rigid elements extending across the axis at spaced positions along the axis, forming a succession of such elements,
  a plurality of fluid-actuatable tension actuators,
  each of said tension actuators having an inflatable flexible bladder extending between two spaced ends and said ends of each actuator having a passage therein providing communication with the interior of the bladder through each end,
  said tension actuators being arranged in communication end-to-end forming first and second strings of tension actuators,
  said first and second strings being positioned on opposite sides of said axis with respective tension actuators so connected to said rigid elements as to form pairs of opposed tension actuators between successive rigid elements, and
  compression-carrying means positioned concentrically with respect to the axis and between successive rigid elements so as to provide pivotal joints between successive rigid elements,
  said compression-carrying means being compression actuators positioned between the opposed pairs of tension actuators.

30. A fluid-pressure actuated elongated jointed member having a longitudinal axis and capable of being moved about in various controlled directions comprising:

a plurality of rigid elements extending across the axis at spaced positions along the axis, forming a succession of such elements, a plurality of fluid-actuatable tension actuators, each of said tension actuators having an inflatable flexible bladder extending between two spaced ends and said ends of each actuator having a passage therein providing communication with the interior of the bladder through each end, said tension actuators being arranged in communication end-to-end forming first and second strings of tension actuators, said first and second strings being positioned on opposite sides of said axis with respective tension actuators so connected to said rigid elements as to form pairs of opposed tension actuators between successive rigid elements, and compression-carrying means positioned concentrically with respect to the axis and between successive rigid elements so as to provide pivotal joints between successive rigid elements, said compression-carrying means are compression actuators each having an inflatable flexible bladder, and the bladder of each compression actuator encircles a pair of opposed tension actuators.

31. A jointed member as claimed in claim 30, in which:

the bladder of each compression actuator has generally the shape of a tire inner tube.

32. A fluid-pressure actuated elongated jointed member as claimed in claim 30, in which:

the flexible inflatable bladders of the compression actuators encircle said first and second strings of tension actuators, and the flexible inflatable bladders of the compression actuators serve as the skin of the jointed member.

33. A fluid-pressure actuated elongated jointed member as claimed in claim 30, in which:

each of said rigid elements has a perimeter, the flexible inflatable bladders of the compression actuators encircle said first and second strings of tension actuators and are connected to the perimeters of said rigid elements, the flexible inflatable bladders of the compression actuators serve as the skin of the jointed member, and said rigid elements include means providing communication between the flexible inflatable bladders of the compression actuators for enabling their simultaneous inflation and deflation.

34. A fluid-pressure actuated elongated jointed member as claimed in claim 30, in which:

said elongated jointed member has a skin, the flexible inflatable bladders of the compression actuators encircle said first and second strings of tension actuators, and the flexible inflatable bladders of the compression actuators are associated with the skin of said elongated jointed member.

35. A fluid-pressure actuated elongated jointed member having a longitudinal axis and capable of being moved about in various controlled directions comprising:

a plurality of rigid elements extending across the axis at spaced positions along the axis, forming a succession of such elements, a plurality of fluid-actuatable tension actuators, each of said tension actuators having an inflatable flexible bladder extending between two spaced ends and said ends of each actuator having a passage therein providing communication with the interior of the bladder through each end, said tension actuators being arranged in communication end-to-end forming first and second strings of tension actuators, said first and second strings being positioned on opposite sides of said axis with respective tension actuators so connected to said rigid elements as to form pairs of opposed tension actuators between successive rigid elements, and compression-carrying means positioned concentrically with respect to the axis and between successive rigid elements so as to provide pivotal joints between successive rigid elements, said compression-carrying means are compression actuators each having an inflatable flexible bladder, and the bladder of each compression actuator has generally an oblate shape.

36. A fluid-pressure actuated elongated jointed member as claimed in claim 35, in which:

said tension actuators are arranged in communication end-to-end forming third and fourth strings of tension actuators, said third and fourth strings are positioned on opposite sides of said axis with respective tension actuators of said third and fourth strings so connected to said rigid elements as to form pairs of opposed tension actuators between successive rigid elements, and said first, second, third and fourth strings of tension actuators are arranged in order first, second, third and fourth around said axis for enabling movement of said elongated jointed member in three dimensions of movement by controllably inflating said first, second, third and fourth strings of tension actuators.

37. A fluid-pressure actuated elongated jointed member having a longitudinal axis and capable of being moved about in various controlled directions, comprising:

a plurality of rigid elements extending across the axis at spaced positions along the axis, forming a succession of such elements, a plurality of fluid-actuatable tension actuators, each of said tension actuators having an inflatable flexible bladder extending between two spaced ends and said ends of each actuator having a passage therein providing communication with the interior of the bladder through each end, said tension actuators being arranged in communication end-to-end forming first and second strings of tension actuators, said first and second strings being positioned on opposite sides of said axis with respective tension actuators so connected to said rigid elements as to form pairs of opposed tension actuators between successive rigid elements, and compression-carrying means positioned concentrically with respect to the axis and between successive rigid elements so as to provide pivotal joints between successive rigid elements, said compression-carrying means are compression actuators each having an inflatable flexible bladder, and the bladder of each compression actuator generally toroidal shape.

38. A fluid-pressure actuated elongated jointed member as claimed in claim 37, in which:
the toroidal shaped bladder of each compression actuator encircles a pair of opposed tension actuators.

39. A fluid-pressure actuated elongated jointed member as claimed in claim 37 in which:
said tension actuators are arranged in communication end-to-end forming third and fourth strings of tension actuators,
said third and fourth strings are positioned on opposite sides of said axis with respective tension actuators of said third and fourth strings so connected to said rigid elements as to form pairs of opposed tension actuators between successive rigid elements,
said first, second, third and fourth strings of tension actuators are arranged in order around said axis for enabling movement of said elongated member in three dimensions of movement by controllably inflating said first, second, third and fourth strings of tension actuators, and
the toroidal shaped bladder of each compression actuator encircles a pair of opposed tension actuators of said first and second string and encircles a pair of opposed tension actuators of said third and fourth string.

40. A fluid-pressure actuated elongated jointed member having a longitudinal axis and capable of being moved about in various controlled directions, comprising:
a plurality of rigid elements extending across the axis at spaced positions along the axis, forming a succession of such elements,
a plurality of fluid-actuatable tension actuators,
each of said tension actuators having an inflatable flexible bladder extending between two spaced ends and said ends of each actuator having a passage therein providing communication with the interior of the bladder through each end,
said tension actuators being arranged in communication end-to-end forming first and second strings of tension actuators,
said first and second strings being positioned on opposite sides of said axis with respective tension actuators so connected to said rigid elements as to form pairs of opposed tension actuators between successive rigid elements, and
compression-carrying means positioned concentrically with respect to the axis and between successive rigid elements so as to provide pivotal joints between successive rigid elements,
said compression-carrying means are compression actuators chamber, and
said inflatable chambers are in communication with each other for enabling said compression actuators to be deflated for collapsing the jointed member upon concurrent deflation of all tension actuators so to permit compact storage of said jointed member.

* * * * *